US011615164B2

(12) United States Patent
Giardalas

(10) Patent No.: US 11,615,164 B2
(45) Date of Patent: Mar. 28, 2023

(54) DYNAMIC WEBSITE CREATION SYSTEM AND METHOD

(71) Applicant: CROWDWISERS, INC., Sudbury, MA (US)

(72) Inventor: Robert Giardalas, Sudbury, MA (US)

(73) Assignee: CROWDWISERS, INC., Sudbury, MA (US)

( * ) Notice: Subject to any disclaimer, the term of this patent is extended or adjusted under 35 U.S.C. 154(b) by 0 days.

(21) Appl. No.: 17/619,089

(22) PCT Filed: Jun. 22, 2020

(86) PCT No.: PCT/US2020/038953
§ 371 (c)(1),
(2) Date: Dec. 14, 2021

(87) PCT Pub. No.: WO2020/263746
PCT Pub. Date: Dec. 30, 2020

(65) Prior Publication Data
US 2022/0207095 A1 Jun. 30, 2022

Related U.S. Application Data

(60) Provisional application No. 62/866,291, filed on Jun. 25, 2019.

(51) Int. Cl.
*G06F 16/958* (2019.01)
*G06F 40/14* (2020.01)
(Continued)

(52) U.S. Cl.
CPC ............ *G06F 16/958* (2019.01); *G06F 16/94* (2019.01); *H04L 51/18* (2013.01); *H04L 51/42* (2022.05)

(58) Field of Classification Search
CPC ....... G06F 16/958; G06F 16/94; H04L 51/18; H04L 51/42
See application file for complete search history.

(56) References Cited

U.S. PATENT DOCUMENTS 6,684,239 B1 * 1/2004 Flepp ................... G06Q 10/107
  709/206
7,581,166 B2  8/2009 Renger
(Continued)

FOREIGN PATENT DOCUMENTS

| CN | 1897019 A | 1/2007 |
| KR | 2004/0086994 A | 10/2004 |
| WO | 2014/063030 A1 | 4/2014 |

OTHER PUBLICATIONS

Cordeiro (Posting to Blogger via Email, published by YouTube in Jun. 24, 2013, pp. 1-4) (Year: 2013).*
(Continued)

*Primary Examiner* — Shahid K Khan
*Assistant Examiner* — Ahamed I Nazar
(74) *Attorney, Agent, or Firm* — The Dobrusin Law Firm, P.C.; Daniela M. Thompson-Walters

(57) ABSTRACT

A method for updating a dynamic website including: a) a user creating or editing one or more draft webpages in a form of one or more emails via one or more email clients thereby storing the one or more draft webpages within one or more email servers; b) automatically converting the one or more draft webpages to one or more publishable webpages suitable for transfer to one or more web servers; c) optionally, automatically creating, updating, or both, one or more index webpages to reference at least one of the one or more publishable webpages; d) publishing the one or more publishable webpages, and optionally the one or more index webpages, as one or more published webpages of a website by transferring the one or more publishable
(Continued)

webpages from the one or more email servers to one or more web servers accessible by one or more web browsers.

20 Claims, 12 Drawing Sheets

(51) Int. Cl.
*H04L 51/18* (2022.01)
*H04L 51/42* (2022.01)
*G06F 16/93* (2019.01)

(56) References Cited

U.S. PATENT DOCUMENTS

| | | | |
|---|---|---|---|
| 7,917,505 B2 | 3/2011 | Van Gent | |
| 8,782,159 B2 | 7/2014 | Shiigi | |
| 8,996,654 B2 | 3/2015 | Polis | |
| 2004/0015476 A1 | 1/2004 | Twaddle | |
| 2007/0162845 A1 | 7/2007 | Cave et al. | |
| 2010/0150446 A1* | 6/2010 | Codignotto | G06V 30/416 |
| | | | 382/186 |
| 2010/0293510 A1 | 11/2010 | Bockus et al. | |
| 2011/0219087 A1* | 9/2011 | Jorasch | G06F 16/957 |
| | | | 709/206 |
| 2014/0006702 A1 | 1/2014 | Liu et al. | |
| 2014/0195889 A1 | 7/2014 | Hampton et al. | |
| 2015/0212984 A1* | 7/2015 | Bowden | G06Q 50/01 |
| | | | 715/234 |
| 2016/0232141 A1 | 8/2016 | Fischer | |
| 2018/0309707 A1 | 10/2018 | Bastide et al. | |

OTHER PUBLICATIONS

International Search Report for International Application PCT/US20/038953, dated Sep. 30, 2020.

Losoviz, "How to Make a Dynamic Website Become Static Through a Content CDN," In: Smashing Magazine, Feb. 2, 2018 (Feb. 2, 2018) Retrieved on Aug. 12, 2020 (Aug. 12, 2020) from https://www.smashingmagazine.com/2018/02/dynamic-website-static-content-cdn/ entire document.

IMAP by Zapier Integrations, https://zapier.com/apps/imap/integrations/wordpress, accessed Nov. 29, 2021.

How to Write a WordPress Post by Email: 2 Easy Methods, https://themeisle.com/blog/wordpress-post-by-email/Updated, Jun. 14, 2018, accessed Dec. 13, 2021.

How to Email Posts to Blogger by Melissa King, https://smallbusiness.chron.com/email-posts-blogger-48933.html, accessed Dec. 14, 2021.

* cited by examiner

DYNAMIC WEBSITE CREATION SYSTEM AND METHOD

FIELD

The present disclosure may relate to a system and method for creating and/or updating a website. The teachings may be related to a dynamic website creation system and method for creating and/or updating a dynamic website. The teachings may be particularly beneficial for providing and/or updating sequencing (e.g., indexing) of webpages within a dynamic website through the use of one or more email clients and email servers.

BACKGROUND

There are a number of website types, including e-commerce, portfolio, business, and blogging websites. Some websites are static in nature, such that content is organized in different webpages and rarely updated. Other websites are dynamic in nature (e.g., "dynamic website"), such that content is more frequently updated and even sorted by topic, chronological order by posting date, and even author. For example, a blog website is a website that is dynamic in nature.

To allow for creation and editing of websites dynamic in nature, there are a number of different platforms available via the Internet. Examples of those platforms include Wordpress, Wix, Blogger, Gator, and Tumblr. These platforms generally require a user to log-in to the platform via a website or downloaded application to allow for edits to the website. For successful use of some of these platforms, a user may need training, hours of practice creating and editing a website, and even experience in website coding.

Platforms for creating and editing websites and website hosts tend to reside on web servers which may leave a website vulnerable to security breaches. Web servers are generally publicly available remote servers, which may expose both draft and published content to security risks. One high security risk is that databases storing website content, generic or customized code for the website, and other generic layers for publishing webpages, all part of a platform, may reside on a publicly accessible web server and thus are easily accessible to security breaches. Security breaches may include hacking, viruses, malware, and the like. Another security risk associated with platforms on web servers is that plugins and design themes by a third party for use in creating a webpage may be easily accessible to hacking, thus crashing the website and even introducing viruses and malware to users of the website. Another security challenge is that backup (e.g., duplicate) websites of a published website may be stored on the same or another public web server, and thus even a backup website is vulnerable to security breaches.

Editing, creating, and indexing webpages may take a substantial amount of processor capacity of one or more web servers. Typically, for dynamic websites with indexed webpages, the draft webpages are created or edited on the web server, indexed on the web server, and then published and publicly accessibly on the web server by a web browser. To update one or more indexes or directories based on newly added indexed webpages, may require scraping a majority, or even all, of the website to determine the newly added content, rename the webpages, and sequence the webpages. This typical process of updating an index may be inefficient and even problematic for frequently updated websites, such as high-volume dynamic websites.

As more individuals want to share their knowledge and opinions to a broader audience via the Internet, there is a need for an easier system to create and update a dynamic website. There is a need for a system which may be intuitive for a user. There is a need for a system which is able to publish content, including HTML content, over to web server. There is a need for a system which allows for more secure web content creation. There is a need for a system which allows for draft content and copies of published content to reside on a separate server from a web server such that it is not publicly accessible. There is a need for a system which is able to sort and index content into different webpages. There is a need for a system to sort and index high volume dynamic websites. There is a need for a system which is able to more efficiently index content. There is a need for a system which is able to sort and index content by different data attributes, such as posting date, author, topic, and the like.

SUMMARY

The present disclosure relates to a method for creating and/or updating a dynamic website including: a) receiving and storing one or more draft webpages in one or more email servers via one or more email clients, the one or more draft webpages having been created or edited by one or more users via the one or more email clients, and the one or more draft webpages in a form of one or more emails; b) automatically converting the one or more draft webpages to one or more publishable webpages suitable for transfer to one or more web servers; c) optionally, automatically creating, updating, or both, one or more index webpages to reference at least one of the one or more publishable webpages; d) publishing the one or more publishable webpages, and optionally the one or more index webpages, as one or more published webpages of a website by transferring the one or more publishable webpages from the one or more email servers to one or more web servers accessible by one or more web browsers.

The present disclosure further relates to a system for creating and/or updating a dynamic website comprising one or more email servers having one or more processors, non-transient storage mediums, or both.

The present teachings provide for a system for creating and updating dynamic websites which may use one or more email clients for creating and updating content. The use of an email client and/or email server may provide an unconventional approach at securely, efficiently, and easily creating and updating website content, as opposed to traditional dedicated website or application-based platforms. The use of an email client may be intuitive for a number of users, as email has become a standard skill required in most educational systems and by employers. The web content may be created with HTML formatting within the email client. The system may be particularly beneficial in the ability to receive and transmit HTML formatting from an email over to a published webpage. The system may provide a secure means of creating and publishing web content. The system may provide for creation of webpages on one or more secure email servers, such as in HTML form, as opposed to creating the content on one or more publicly accessible web servers. The system may be particularly beneficial as it may be configured to automatically index webpages. By using the subject and timestamp associated with a draft webpage in an email client, the system may be able to chronologically (e.g., reverse chronological order) sort the webpages. Further, as the email client may have the ability to have multiple folders and subfolders, the system may be able to convert those folders into a homepage, index webpage, and summaries of webpages stored therein. The system may provide for a more efficient process for indexing webpages. Indexing may be more efficient as only new content may need to be indexed and added to a directory as opposed to re-indexing all content upon creation or editing of a webpage of a website.

BRIEF DESCRIPTION OF DRAWINGS

FIG. 11 illustrates an index of how FIG. 11A relates to FIG. 11B.

DETAILED DESCRIPTION

Figure 1:
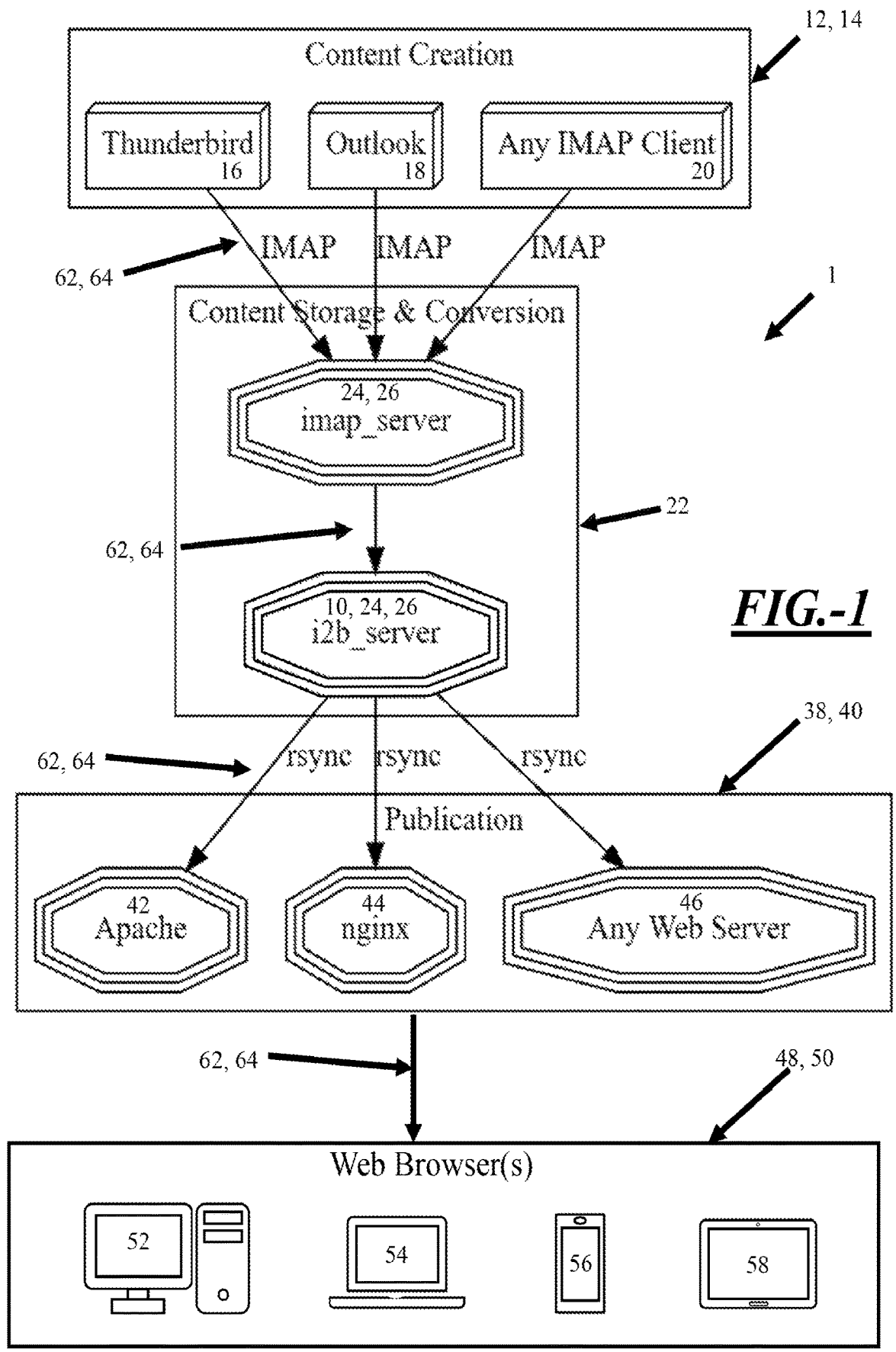
FIG. 1 illustrates a network in which a dynamic website creation system is integrated.

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

System

The system may include one or more clients. The one or more clients may function to provide a user interface for creating, editing, indexing, deleting or any combination thereof one or more webpages of one or more websites. The one or more clients may include one or more email clients, one or more website building platforms, the like, or a combination thereof. The one or more exemplary email clients may include Thunderbird, Outlook, eM Client, Mailbird, Windows Mail, Postbox, the Bat!, Front, Gmail, the like, or a combination thereof. The one or more clients may be compatible with and support one or more computing protocols and standards. The one or more protocols may allow for one or more email clients to access one or more servers. The one or more servers may include one or more email servers, web servers, or both. One or more email servers may provide for secure communication. The one or more protocols may allow for a plurality of clients to access the same server. The one or more protocols may allow for draft (e.g., unpublished) content created on a client to be transferred over to one or more servers. For example, unpublished content created on an email client may be transferred to an email server. The draft content may maintain all or a majority of its formatting. Formatting may include HTML, text, multi-content format, the like, or any combination thereof. Draft content may even be formatted in plain text and converted into HTML. For example, the draft content may be formatted in Markdown language. One or more protocols may include POP3, IMAP (IMAP4), SMTP, NNTP, LDAP (v2, v3), EWS, IPv6, MAPI, RSS Feeds, ATOM Feeds, iCalendar, MAPI/RPC, CalDAV, CardDAV, and the like. For example, the one or more email clients may be compatible with and/or support IMAP.

The one or more clients may provide for a user interface. The user interface may allow for a user to view, create, edit, index, and/or delete one or more draft webpages for a website. At least part of a user interface may be displayed on a computing device when operating the one or more clients. For example, the user interface may be displayed on a graphic user interface (e.g., computer screen) when a user opens an email client. The user interface may be the interface of a client. For example, the user interface may be the interface of an email client. Providing a user interface of an email client provides the user with an interface they are familiar and comfortable with due to routinely using for typical email tasks. The user interface may provide for a back-end of the website. The user interface may provide for (e.g., display) one or more, even a plurality, of folders. One or more folders may include an inbox, drafts, publish, trash, spam, the like, or any combination thereof. Folders may include standard folders included in an email client; custom folders created by the user; customer folders provided by the system, such as through a server; or any combination thereof. One or more folders may include one or more subfolders. One or more subfolders may be considered a child folder to a parent folder. One or more folders and/or subfolders may be static, indexed, or both. One or more folders and/or subfolders may be categorized as static, indexed, or both by a user. A user may create one or more folders using and/or on one or more email clients. A user may save one or more draft webpages within one or more folders. A user interface may allow for a draft webpage to be created or edited in an email. One or more draft webpages may include a header, a body, or both. A header may include a subject, a timestamp, a summary, the like, or a combination thereof. A body may include one or more images, text, hyperlinks, the like, or a combination thereof. A user interface may be interacted with by a user via an interaction interface.

One or more interaction interfaces may be part of one or more computing devices. The one or more interaction interfaces may include one or more graphic user interfaces (GUI), audio interfaces, image interfaces, the like, or any combination thereof. One or more graphic user interfaces may function to display a user interface of the email client;

to display one or more draft webpages, published webpages, unpublished webpages, and the like as a user may be viewing, creating, editing, indexing, and/or deleting; or any combination thereof. The one or more graphic interfaces may include one or more screens. The one or more screens may be a screen located on and/or in communication with a computing device. The one or more screens may be a screen on a mobile computing device, non-mobile computing device, or both. The one or more graphic interfaces may include and/or be in communication with one or more user input devices, audio interfaces, image interfaces, the like, or any combination thereof. The one or more user input devices may allow for receiving one or more inputs from a user. One or more inputs may include tactile inputs, audio inputs, optical inputs, the like, or a combination thereof. The one or more input devices may include one or more buttons, wheels, keyboards, switches, mice, joysticks, touch pads (i.e., a touch-sensitive area, provided as a separate peripheral or integrated into a computing device, that does not display visual output), touch-sensitive monitor screens, microphones, cameras, the like, or any combination thereof. The one or more input devices may be in communication with and/or integrated with a graphic user interface. An audio interface may function to project sound to a user and/or receive sound from a user. An image interface may function to capture, receive, display, and/or transmit one or more images, video, or both. An image interface may include one or more cameras.

The one or more clients may allow for a user to draft and publish a draft webpage in the form of an email. An email may be considered a window that opens for a user within a user interface of a client. The email may include one or more fields (e.g., text boxes) for one or more recipients (e.g., "To", "Cc", "Bcc"), a subject, a body, one or more attachments, the like, or any combination thereof A body of a draft webpage may be compatible with a variety of input formats. Input formats may be compatible with text, text formatting, images, tables, hyperlinks, attachments, the like, and any combination thereof. Input formats may include HTML, Rich Text, Plain Text, the like, or any combination thereof. Input format may even include Markdown language which is converted to HTML. The input format in which a draft webpage is created may be carried over to the published webpage. The user interface may allow for an email (e.g., draft content) to be saved within one or more folders by a user. A user may move an email from a draft folder to a publish folder to allow for a draft webpage (e.g., email within draft folder) to be converted to a publishable webpage, published webpage (e.g., email within published folder and publicly available on website), or both. The one or more fields of a draft webpage may convert as one or more fields of a published webpage. The one or more fields of a draft webpage may automatically convert as one or more corresponding fields of a published webpage when a draft webpage is converted to a published webpage. For example, a subject of an email may become the subject or title of a webpage while the body of an email becomes the body of the webpage. Once a draft webpage is created and saved onto the one or more clients (e.g., locally on the user's computing device), the draft webpage may also be saved onto one or more servers. The draft webpage may be automatically saved onto one or more email servers at substantially the same time the draft webpage is saved onto the one or more clients. The one or more clients may be in communication with one or more servers, such as through a network.

The system may include one or more servers. One or more servers may function to transmit, receive, store, convert, or any combination thereof data from one or more email clients to one or more other servers, browsers, computing devices, and/or the like. The one or more servers may function to convert one or more draft webpages from one or more clients to one or more published webpages of a website. The one or more servers may be compatible with one or more input formats. The input formats may be the same as the input formats of one or more email clients. For example, the one or more servers may be compatible with HTML, Markdown, Rich Text, Plain Text, the like, and a combination thereof. The one or more servers may be in communication with one or more email clients, servers, browsers, communication hubs, networks, the like, or any combination thereof. The one or more servers may include one or more motherboards, processors, storage mediums, drives, communication modules, the like, or any combination thereof. The one or more servers may include one or more physical servers, virtual servers, or a combination of both. The one or more servers may be non-transient. One or more servers may include one or more local servers, remote servers, or both. The one or more servers may include one or more emails servers, web servers, or a combination thereof.

The one or more servers may include one or more email servers. The one or more email servers may function to provide a secure server for publishing, indexing, or both of one or more webpages; convert one or more draft webpages to one or more published webpages; or any combination thereof. The one or more email servers may be compatible with one or more protocols. The one or more protocols may be the same protocols that one or more email clients are compatible with. For example, the one or more email servers may include one or more IMAP servers. One or more exemplary email servers may include: Apache James, Citadel/UX, Dovecot, IBM Lotus Domino, MDaemon, Microsoft Exchange Server, Oracle Beehive, Zimbra, the like, or any combination thereof. The one or more email servers may require user authentication to receive, send, or both data to and from one or more email clients, web browsers, other email servers, or any combination thereof. User authentication may include a user ID and password. The one or more email servers may include a user database stored therein for authorized users and their associated permission levels. The one or more email servers may be accessible via one or more email clients, one or more web browsers, or both. For example, a user may send one or more draft webpages onto an email server via a user interface of an email client. As another example, a user may approve one or more draft webpages for publishing by logging into a back-end user interface via a web browser. The one or more email servers may automatically convert one or more draft webpages to one or more publishable webpages such that they are suitable for transfer to one or more web servers. One or more email servers may automatically apply site-wide styling to at least one of one or more publishable webpages. The one or more email servers may automatically create, update, or both one or more index webpages. The one or more email servers may automatically create, update, or both one or more index webpages to reference at least one or more publishable webpages. One or more publishable webpages residing within one or more indexed folders may be automatically index before, after, or simultaneous creating, updating, or both of one or more index webpages. At least one of the one or more publishable webpages may be indexed without having to index one or more previously published webpages. The one or more email servers may include a single or a plurality of email servers. One or more email servers may include a single email server, a plurality of email servers in communication with one another, or both. A single email server may store draft webpages, convert draft webpages to publishable webpages, or both. A plurality of email servers may include at least a first server and a second server. At least one first server may store draft webpages, transmit the draft webpages to at least one second server, or both. At least one second server may convert draft webpages to publishable webpages. One or more emails servers may include one or more processors, non-transient storage mediums, or both. For example, one IMAP server may be in communication with another IMAP server. One or more email severs may be in communication with one or more email clients, one or more web servers, or both. One or more email servers may be in communication with one or more clients, servers, or both via one or more networks. The one or more email servers may have a dynamic website creation system stored therein.

The system includes a dynamic website creation system. The dynamic website creation system functions to convert one or more draft webpages sent to one or more secure servers (e.g., email server) to one or more publishable webpages suitably formatted for publishing, to one or more published webpages transmitted to one or more publicly available servers (e.g., web servers), or both. The dynamic website creation system may reside within one or more servers. The dynamic website creation system may specifically reside within one or more email servers. The dynamic website creation system may reside in a same or separate server as one or more email clients. The dynamic website creation system may include or be able to access one or more processors, storage mediums, or both of an email server. The dynamic website creation system may reside within the same or a separate email server as the initial draft webpages are delivered to from the one or more email clients. For example, the dynamic website creation system may reside within an email server in communication with and in between another email server and a web server. As another example, the dynamic website creation system may reside within the same email server that is in communication with and between one or more email clients and one or more web servers. The dynamic website creation system may be stored within one or more storage mediums of one or more servers and accessible by one or more processors of the one or more servers. The dynamic website creation system may include one or more algorithms, rules, databases, the like, or any combination thereof. The dynamic website creation system may include one or more computer-executable instructions (e.g., software). The one or more algorithms and/or rules may be formatted as computer-executable instructions. The instructions may be stored in one or more storage mediums and executed by one or more processors. One or more algorithms may include one or more website configuration algorithms, one or more content detection and creation algorithms, one or more indexing algorithms, one or more publishing algorithms, the like, or a combination thereof. The one or more rules may include one or more rules applied by the one or more algorithms to make a determination and move on to a subsequent step in the algorithm, move on to a subsequent algorithm, or both. The one or more algorithms and rules may be stored in a storage medium within the same or a different server as the dynamic website creation system.

Using one or more algorithms, the dynamic website creation system may be able to convert one or more draft webpages sent from an email client into one or more publishable webpages, all on a secure email server. The use of the email server is beneficial as it allows for draft webpages in HTML format, such as those drafted in an email user interface, to carry over a substantial amount, if not all, of their formatting while a majority of the conversion process takes place on a secure email server. The email server may be able to convert non-HTML input format into HTML. For example, the email server may convert Markdown plain text language in a draft webpage into HMTL on a publishable webpage. The dynamic website creation system is then able to transfer the publishable webpages from a secure email server over to a publicly available web server, such that they are accessible by one or more web browsers. As an example, the dynamic website creation system on the email server converts the draft webpages to simple HTML webpages within the email server and then only transfers those HTML webpages onto publicly accessible web servers. By generating the publishable webpages on a secure email server, as opposed to a publicly available web server, the website is much less vulnerable to security attacks during the publication process.

Also using one or more algorithms, the dynamic website creation system may be able to efficiently index one or more indexed webpages. The dynamic website creation system may be able to index a plurality of indexed webpages without having to rename a number of webpages, re-sequence a number of webpages, and/or even without spending a substantial about of computing time and memory searching and comparing previous webpages to new ones for indexing. Using one or more indexing algorithms, the dynamic website creation system may be able to rely on timestamp data of one or more newly published webpages to update one or more index webpages (e.g., webpages which display summaries of chronologically sorted indexed webpages). One or more published webpages which may be indexed may have a timestamp newer than a timestamp of a previously published index webpage. The dynamic website creation system may automatically name draft webpages (e.g., assign nomenclature) upon publication to published webpages based on their folder location within one or more clients, a timestamp associated with their publishing or creation, the folder identification (e.g., static or indexed) in which the webpage resides, the like, or a combination thereof. This nomenclature may be referred to as static nomenclature and indexed nomenclature as described herein, such as with respect to the description of FIG. 10. Based on nomenclature assigned to a webpage, such as during a content detection and creation process, the dynamic webpage creation system is able to quickly identify what new indexed webpages are published to a website and only update the index listing and index webpage to account for this new content. The indexing process is thus able to usually avoid scraping an entire website to update one or more index webpages and summaries, thus making the indexing process much more efficient.

The one or more servers may include one or more web servers. One or more web servers may function to store one or more dynamic websites, to allow one or more published webpages to be publicly accessible via one or more web browsers, one or more draft webpages to be securely accessibly via one or more web browsers, or any combination thereof. The one or more web servers may be any web server which may store one or more websites, process data associated with one or more websites, deliver data from one or more email servers to one or more web browsers, or any combination thereof. The one or more web servers may be any web server capable of storing, processing, and/or delivering website data associated with the input formats compatible with one or more clients, email servers, or both. The one or more web servers may be compatible with one or more protocols. An exemplary protocol may include hypertext transfer protocol (HTTP). A web server which uses HTTP may be referred to as an HTTP web server. Some suitable web servers may include Apache HTTP Server, nginx, Internet Information Services (IIS), Lite Speed Web Server (LSWS), Google Web Server (GWS), and the like.

The one or more web servers may be accessible by one or more web browsers. The one or more web browsers may function to access a dynamic website stored on one or more servers via a network through one or more computing devices. The one or more web browsers may allow for one or more computing devices to connect to a secure email server to interact with a back-end interface of a dynamic website. The back-end interface may be the user interface. The one or more web browsers may allow for one or more computing devices to connect to a public web server to interact with a front-end interface of a dynamic website. The one or more web browsers may be stored on one or more storage mediums of one or more computing devices, accessible by one or more processors, or both. One or more exemplary web browsers may include Chrome, Firefox, Safari, Internet Explorer, Edge, the like, or any combination thereof.

The system may include and/or be in communication with one or more computing devices. The one or more computing devices may function to have one or more clients, web browsers, or both stored therein, accessible by a user, or both. The one or more computing devices may function to provide one or more user interfaces, back end user interfaces, front end user interfaces, interaction interfaces, the like, or any combination thereof. The one or more computing devices may function to allow a user to create or edit one or more webpages via one or more user interfaces, back-end user interfaces, interaction interfaces, or a combination thereof. The one or more computing devices may allow for a user to visit one or more websites and interact with one or more published webpages via one or more front-end user interfaces. One or more computing devices may include or be in communication with one or more other computing devices, servers, email clients, browsers, processors, storage mediums, databases, the like, or any combination thereof. The one or more computing devices may include one or more non-transient storage mediums, processors, or both. One or more computing devices may include one or more personal computers (e.g., laptop, desktop, etc.), mobile computing devices (e.g., tablet, mobile phone, etc.), or a combination thereof. One or more computing devices may include one or more processors.

The system may include one or more processors. The one or more processors may function to analyze one or more signals (e.g., data) from one or more clients, servers, browsers, computing devices, storage mediums, databases, communication modules, or any combination thereof. The one or more processors may be located within or in communication with one or more computing devices, servers, and the like. For example, the one or more email servers, web servers, computing devices, or a combination thereof include one or more processors. One or more processors may be in communication with one or more other processors. The one or more processors may function to execute one or more computer-readable instructions, process data, execute one or more algorithms to analyze data, apply one or more rules, evaluate data against one or more rules, or any combination thereof. Processing data may include receiving, transforming, outputting, executing, the like, or any combination thereof. The one or more processors may execute one or more algorithms, rules, or both associated with the dynamic website creation system. The one or more processors may execute one or more algorithms, rules, or both automatically, upon instruction from a user, or both. The one or more processors may execute automatic steps of a method for creating and/or updating a dynamic website based on software stored within one or more non-transient storage mediums. One or more processors may execute software stored on one or more non-transient storage mediums to automatically publish, index, or both one or more draft webpages created in one or more email clients by a user. One or more processors may be part of hardware, software, systems, or any combination thereof. One or more hardware processors may include one or more central processing units, multi-core processors, front-end processors, the like, or any combination thereof. One or more software processors may include one or more word processors, document processors, the like, or any combination thereof. One or more system processors may include one or more information processors, the like, or a combination thereof. The one or more processors may be located within a same or different non-transient device as one or more servers, storage mediums, other processors, communication modules, communication hubs, or any combination thereof. The one or more processors may include one or more cloud-based processors. Cloud-based may mean that the one or more processors may reside in a non-transient device located remotely from another computing device, processor, storage medium, databases, or any combination thereof. One or more cloud-based processors may be accessible via one or more networks. The one or more processors may access one or more algorithms, rules, data, and the like saved within one or more storage mediums.

The system may include one or more storage mediums. The one or more storage mediums may function to store the data associated with the one or more webpages, databases, computer readable instructions, and the like. The one or more storage mediums may include one or more hard drives (e.g., hard drive memory), chips (e.g., Random Access Memory "RAM"), discs, flash drives, memory cards, the like, or any combination thereof. The one or more storage mediums may be one or more non-transient storage mediums. The one or more storage mediums may be located within or in communication with one or more computing devices, servers, and the like. For example, the one or more email servers, web servers, computing devices, or a combination thereof include one or more non-transient storage mediums. The one or more storage mediums may include one or more cloud-based storage mediums. A cloud-based storage medium may be located remote from a one or more servers, computing devices, processors, databases, or any combination thereof. One or more cloud-based storage mediums may be accessible via one or more networks. One or more storage mediums may store one or more data entries in a native format, foreign format, or both. One or more storage mediums may be suitable for storing input formats compatible with one or more clients, servers, or both. One or more storage mediums may store data entries as objects, files, blocks, or a combination thereof. The one or more storage mediums may include one or more algorithms, rules, databases, data entries, the like, or any combination thereof stored therein.

The system may be integrated into one or more networks. The one or more networks may function to allow multiple computing devices to be in communication with one another. The network may allow for one or more clients, servers, browsers, and computing devices to communicate with one another. The network may allow for data associated with one or more draft webpages to be transmitted from one or more clients to one or more servers. The network may allow for data associated with one or more draft or published webpages to be transmitted One or more networks may include one or more clients, servers, browsers, computing devices, communication hubs, communication modules, processors, storage mediums, the like, or a combination thereof. One or more networks may be connected to one or more other networks. One or more networks may include one or more local area networks (LAN), wide area networks (WAN), virtual private network (VPN), intranet, Internet, the like, or any combination thereof. The network may be temporarily, semi-permanently, or permanently connected to any component of the system.

The system may include one or more communication modules. The one or more communication modules may allow for the one or more email clients, servers, browsers, and computing devices to receive and/or transmit one or more signals from one another, be integrated into a network, or both. The one or more communication modules may have any configuration which may allow for one or more data signals to be relayed to one or more other email clients, servers, browsers, computing devices, communication modules, communication hubs, networks, processors, the like, or any combination thereof. The one or more communication modules may include one or more wired communication modules, wireless communication modules, or both. A wired communication module may be any module capable of transmitting and/or receiving one or more data signals via a wired connection. One or more wired communication modules may communicate via one or more networks via a direct, wired connection. A wired connection may include a local area network wired connection by an ethernet port. A wired communication module may include a PC Card, PCMCIA card, PCI card, the like, or any combination thereof. A wireless communication module may include any module capable of transmitting and/or receiving one or more data signals via a wireless connection. One or more wireless communication modules may communicate via one or more networks via a wireless connection. One or more wireless communication modules may include a Wi-Fi transmitter, a Bluetooth transmitter, an infrared transmitter, a radio frequency transmitter, an IEEE 802.15.4 compliant transmitter, the like, or any combination thereof. A Wi-Fi transmitter may be any transmitter complaint with IEEE 802.11. A communication module may be single band, multi-band (e.g., dual band), or both. A communication module may operate at 2.4 Ghz, 5 Ghz, the like, or a combination thereof. A communication module may communicate with one or more other communication modules, computing devices, processors, or any combination thereof directly; via one or more communication hubs, networks, or both; via one or more interaction interfaces; or any combination thereof.

The system may be in communication with one or more communication hubs. A communication hub may function to receive one or more signals, transfer one or more signals, or both from one or more clients, servers, browsers, computing devices, and the like. The communication hub may be any type of communication hub capable of sending and transmitting data signals over a network to one or a plurality of computing devices. The communication hub may include a wired router, a wireless router, an antenna, a satellite, or any combination thereof. For example, an antenna may include a cellular tower. The communication hub may be connected to one or more computing devices, servers, or both, via wired connection, wireless connection, or a combination of both. The communication hub may allow for communication of a computing device with a server and vice-versa when the computing device is directly connected to the communication hub, indirectly connected to the communication hub, or both. A direct connection to the communication hub may mean that the computing device is directly connected to the communication hub via a wired and/or wireless connection and communicates through the communication hub. An indirect connection to the communication hub may mean that a computing device first communicates with one or more other computing devices via a network before transmitting and/or receive one or more signals to and/or from the communication hub.

Dynamic Website

The system may find particular use in the creating, editing, indexing, and sharing of one or more dynamic websites. A dynamic website may be a website with content dynamic in nature such as discussed hereinbefore. A dynamic website may include one or more webpages. The dynamic website creation system of the teachings herein may be particularly beneficial for use with a dynamic website hosting a collection of a plurality of webpages. The one or more webpages may be considered static, dynamic, or both. A static webpage may be a webpage which is not updated frequently and remains substantially the same over time. A dynamic webpage may be a webpage which is updated frequently. For example, an index webpage of indexed webpages may be considered a dynamic webpage. The website may include a plurality of indexed webpages associated with one or more index webpages. For example, chronologically sorted blog posts by publishing date and associated with a topic may be displayed on an index webpage associated with the same topic. An index webpage may be a more aesthetically pleasing view of a directory associated with at least a portion of the website. One or more, or even all, of the webpages of a website may include a header, body, footer, or a combination thereof. A header may include a subject associated with the draft webpage, timestamp of creating or publishing a draft webpage, or both. A body may include the body of a draft webpage. A footer may be part of a generic configuration associated with the website.

Process of Creating Dynamic Website with Dynamic Website Creation System

The dynamic website creation system may be particularly beneficial for creating, editing, and indexing one or more dynamic websites. The dynamic website creation system may function by executing one or more algorithms, rules, or both to convert one or more draft webpages residing on one or more clients to one or more published webpages publicly accessible on one or more web servers. One or more algorithms may include one or more website configuration algorithms, one or more content detection and creation algorithms, one or more indexing algorithms, one or more publishing algorithms. One or more website configuration algorithms may include a website configuration process as described herein. One or more content detection and creation algorithms may include one or more content detection and creation processes as described herein. One or more indexing algorithms may include one or more indexing processes as described herein. One or more publishing algorithms may include one or more publishing processes as described herein. One or more rules may include one or more rules applied during one or more algorithms to make a decision or determination before the algorithm moves on to a subsequent step. One or more rules may include nomenclature assignment, indexing determination, destination determination, newness determination, static determination, static destination determination, summary determination, new entry determination, last page quantity determination, new page quantity determination, current page quantity determination, new page relink decision, and the like as described herein.

A method for creating and/or updating a dynamic website may comprise: receiving and storing one or more draft webpages in one or more email servers via one or more email clients, the one or more draft webpages having been created or edited by one or more users via the one or more email clients, and the one or more draft webpages in a form of one or more emails; automatically converting the one or more draft webpages to one or more publishable webpages suitable for transfer to one or more web servers; optionally, automatically creating, updating, or both, one or more index webpages to reference at least one of the one or more publishable webpages; publishing the one or more publishable webpages, and optionally the one or more index webpages, as one or more published webpages of a website by transferring the one or more publishable webpages from the one or more email servers to one or more web servers accessible by one or more web browsers; or any combination thereof.

The method may include receiving and/or storing one or more draft webpages in one or more email servers via one or more email clients. The one or more draft webpages may be created and/or edited (e.g., updated) by one or more users. The one or more draft webpages may be created and/or edited on one or more email clients. The one or more draft webpages may be in a form of one or more emails. The user may create one or more folders on the one or more email clients. The user may save the one or more draft webpages within the one or more folders.

The method may include automatically converting one or more draft webpages to one or more publishable webpages. The conversion may allow for the one or more publishable webpages to be suitable for transfer to one or more web servers. Automatically converting may be completed by one or more email servers. Conversion may include applying site-wide styling to one or more one or more publishable webpages. The same or a different email server may convert the one or more draft webpages to one or more publishable webpages as receives the one or more draft webpages. For example, at least one first email server may store one or more draft webpages and at least one second email server may convert the draft webpages to publishable webpages. As another example, the same email server may store one or more draft webpages and convert the draft webpages to publishable webpages. One or more processors within the one or more email servers may access and/or execute software stored in one or more non-transient storage mediums to automatically publish, index, or both the one or more draft webpages. The one or more email servers may be in communication with one or more email clients, one or more web servers, or both.

The method may include automatically creating, updating, or both one or more index webpages. One or more index webpages may reference at least one of the one or more publishable webpages. The one or more index webpages may include a summary. The summary may remain unimpacted or be updated when at least one or more index webpages may be added to an index webpage. The one or more index webpages may include an index listing. An index listing may be a listing of one or more published webpages. An index listing may be a listing of one or more published webpages located in a same folder (e.g., index folder) as the index webpage. The one or more published webpages listed in an index listing may be automatically sorted. Automatic sorting may be chronological, reverse chronological, alphabetical, reverse alphabetical, the like, or both. Sorting may be determined by a timestamp, header, body, the like, or any combination thereof.

The method may include publishing the one or more publishable webpages. The publishable webpages upon publishing may be one or more published webpages of a website. The one or more published webpages may be published by transferring one or more publishable webpages from one or more email servers to one or more web servers. The one or more web servers may be accessible by one or more web browsers. At least one of the one or more publishable webpages may be indexed. Indexing may occur without having to index one or more previously published webpages. Previously published webpages may be those sharing the same index folder, another folder, previously published webpages on the same website, the like, or any combination thereof. One or more published webpages which may be indexed may have a timestamp. The timestamp may be newer than a timestamp of a previously published index webpage.

The method may include publishing the one or more index webpages. The publishable index webpages upon publishing may be one or more index webpages of a website. The one or more index webpages may be published by transferring one or more publishable index webpages from one or more email servers to one or more web servers. The one or more web servers may be accessible by one or more web browsers.

Illustrative Examples

The following descriptions of the Figures are provided to illustrate the teachings herein but are not intended to limit the scope thereof. The Figures may provide exemplary illustrations of the systems and methods taught herein.

FIG. 1 illustrates a schematic of a network 1 suitable for use with a dynamic website creation system 10. The network 1 includes one or more clients 12. The one or more clients include one or more email clients 14. The one or more email clients may include Thunderbird 16, Outlook 18, and/or other similar email clients 20. The one or more clients use Internet Message Access Protocol (IMAP). The one or more clients 12 are in communication with one or more servers 22. The one or more clients 12 may be able to send and retrieve data 62 to and from the one or more servers 22. The data 62 may be transmitted in HTML format 64 between the one or more clients 12 and the one or more servers 22.

The one or more servers 22 may include one or more email servers 24. The one or more email servers 24 may include one or more IMAP email servers 26. An exemplary IMAP email server may be Dovecot. The one or more IMAP email servers 26 may be one in the same or may be separate servers (e.g., residing on same or separate physical machines). One of the servers 22 may include the dynamic website creation system 10 stored therein. The one or more servers 22 may include one or more motherboards 28 (not shown), processors (e.g., CPU) 30 (not shown), storage mediums (e.g., memory) 32 (not shown), one or more drives 34 (not shown), and one or more network connections 36 (not shown). If two separate email servers 24 are used, they may be in communication with one another. If two separate email servers 24 are used, they may both be IMAP email servers 26. The one or more servers 22 are in communication with one or more web servers 38. The one or more servers 22 may transfer data 62 to the one or more web servers 28 via the Rsync utility.

One or more web servers 38 may receive data 62 from one or more servers 22. The one or more web servers 38 may include one or more HTTP servers 40. Exemplary web servers may include Apache 42, nginx 44, and/or other similar web servers 46. The one or more web servers 38 may include one or more motherboards, processors, storage mediums, drives, and/or network connections (not shown). The one or more web servers may be in communication with one or more web browsers 48.

The one or more web browsers 48 may be on one or more user computing devices 50. The one or more computing devices 50 may include one or more desktop computers 52, laptops 54, mobile phones 56, tablets 58, and/or other similar computing devices.

Figure 2:
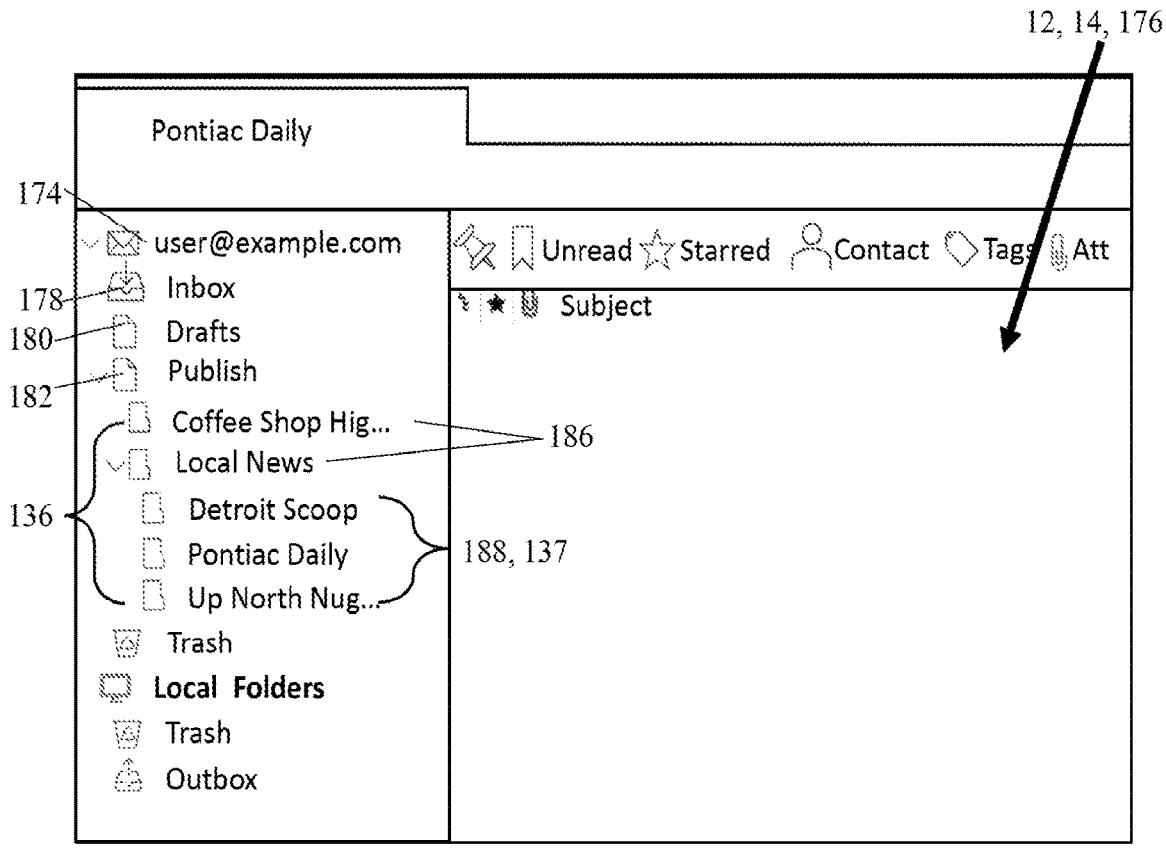
FIG. 2 illustrates an interface of an email client.

FIG. 2 illustrates a user interface 176 of a client 12. The client 12 may be an email client 14. The client 12 includes a user identification 174. The user identification 174 is associated with an account of the user. The client 12 also includes an inbox folder 178, drafts folder 180, and publish folder 182. In the publish folder 182 there are a plurality of folders 136. The plurality of folders 136 may be and also include further subfolders 137. For example, the folders 136 include parent folders 186 and child folders 188. Child folders 188 are considered subfolders 137 to a respective parent folder 186.

Figure 3:
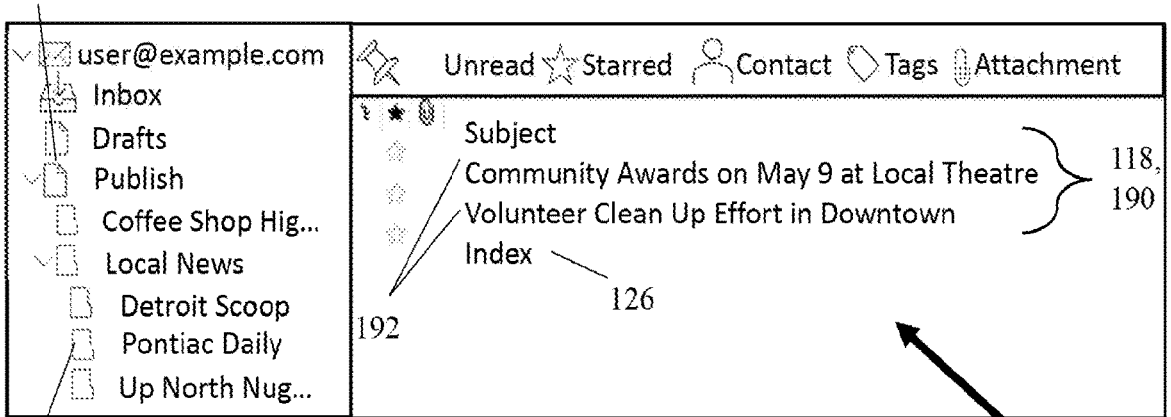
FIG. 3 illustrates an interface of an email client.

FIG. 3 illustrates a user interface 176 of a client 12. The client 12 may be an email client 14. The client 12 includes a publish folder 182. Within the publish folder 182, the client 12 includes a parent folder 186 having a child folder 188. Located within the child folder 188 is a plurality of webpages 118. The webpages 118 are also published webpages 190. The webpages 118 are published webpages 190 as they are located within the published folder 182. The webpages 118 include an indexed webpage 126 and content webpages 192.

Figure 4:
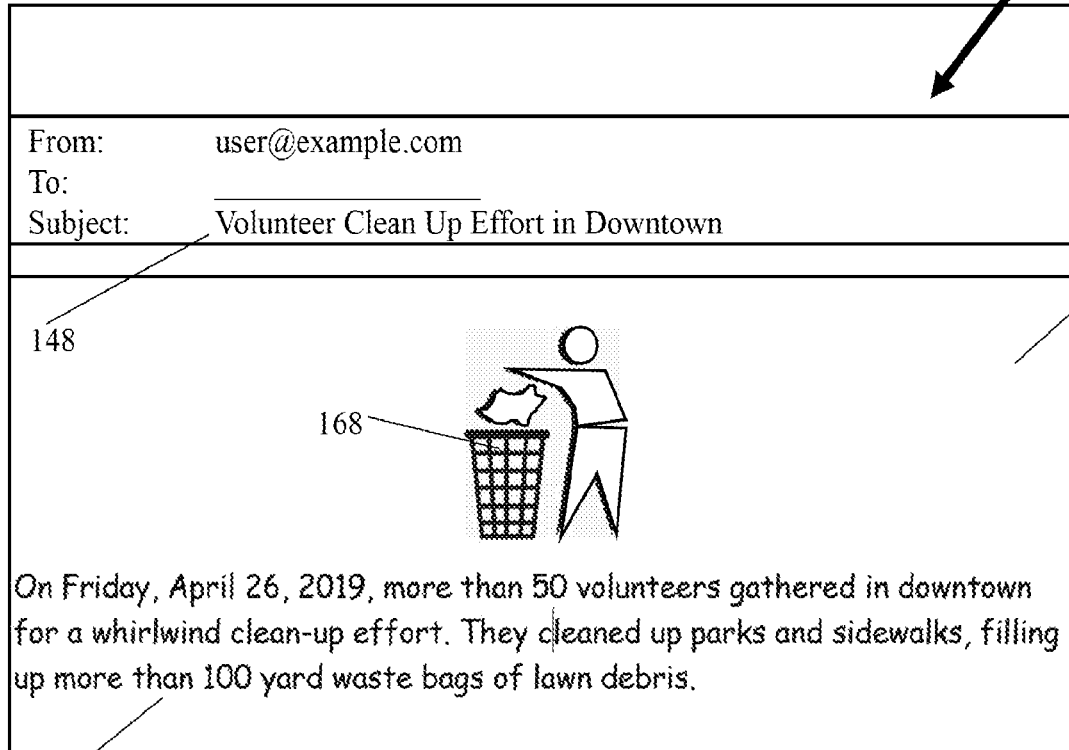
FIG. 4 illustrates a draft webpage within an email client.

FIG. 4 illustrates a user interface 176 of a client 12. Within the user interface 176, a user is drafting a draft webpage 106. The draft webpage 106 is in the format of an email 138. The draft webpage 106 includes a subject 148 and body 164. The body 164 includes both an image 168 and text 169. The draft webpage 106 is able to be saved as a draft webpage 106 by being saved into the drafts folder 180, such as shown in FIGS. 2 and 3. After being saved as a draft webpage 106, the draft webpage 106 may be published as a published webpage 190 by moving into the publish folder 182, such as shown in FIGS. 2 and 3.

Figure 5:
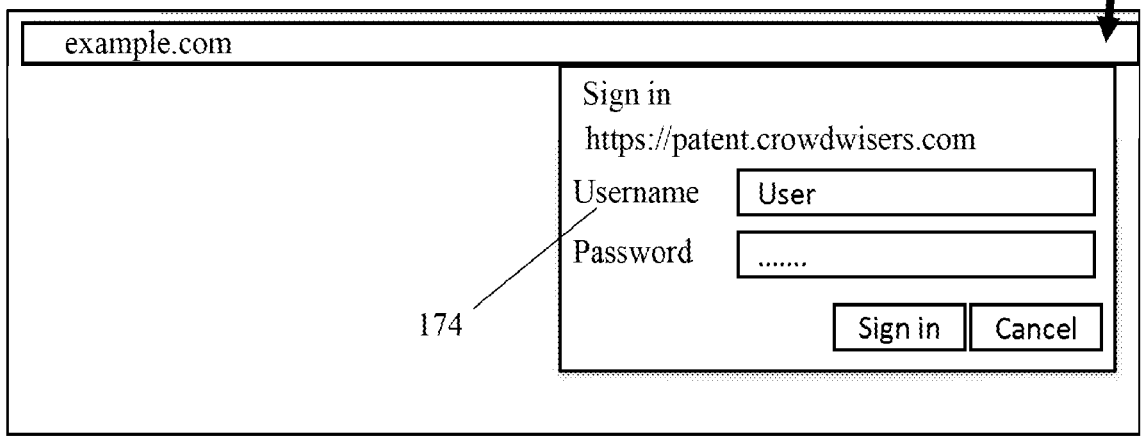
FIG. 5 illustrates a backend user interface of the system.

FIG. 5 illustrates a backend user interface 177 starting at a log-in window 194. The user logs into the backend user interface 177 with their user identification.

Figure 6:
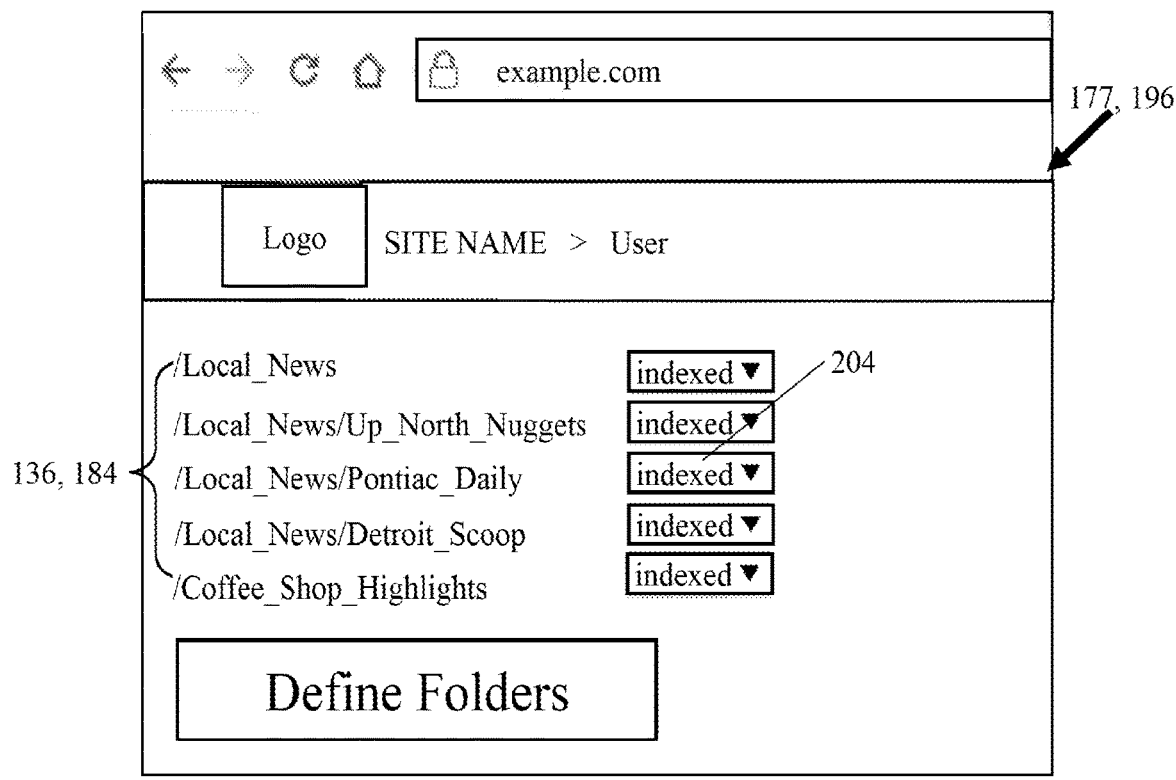
FIG. 6 illustrates a backend user interface of the system.

FIG. 6 illustrates a backend user interface 177 in a folder definition window 196. After a user adds a new folder 136, such as a subfolder 184 into the publish folder 182 via a user interface 176 of a client 12, the user may then define a configuration of the folder 136. The folder 136 may be categorized as a static folder 202 or indexed folder 204 in the folder definition window 196. As illustrated, each folder 136 is defined as an index folder 204.

Figure 7:
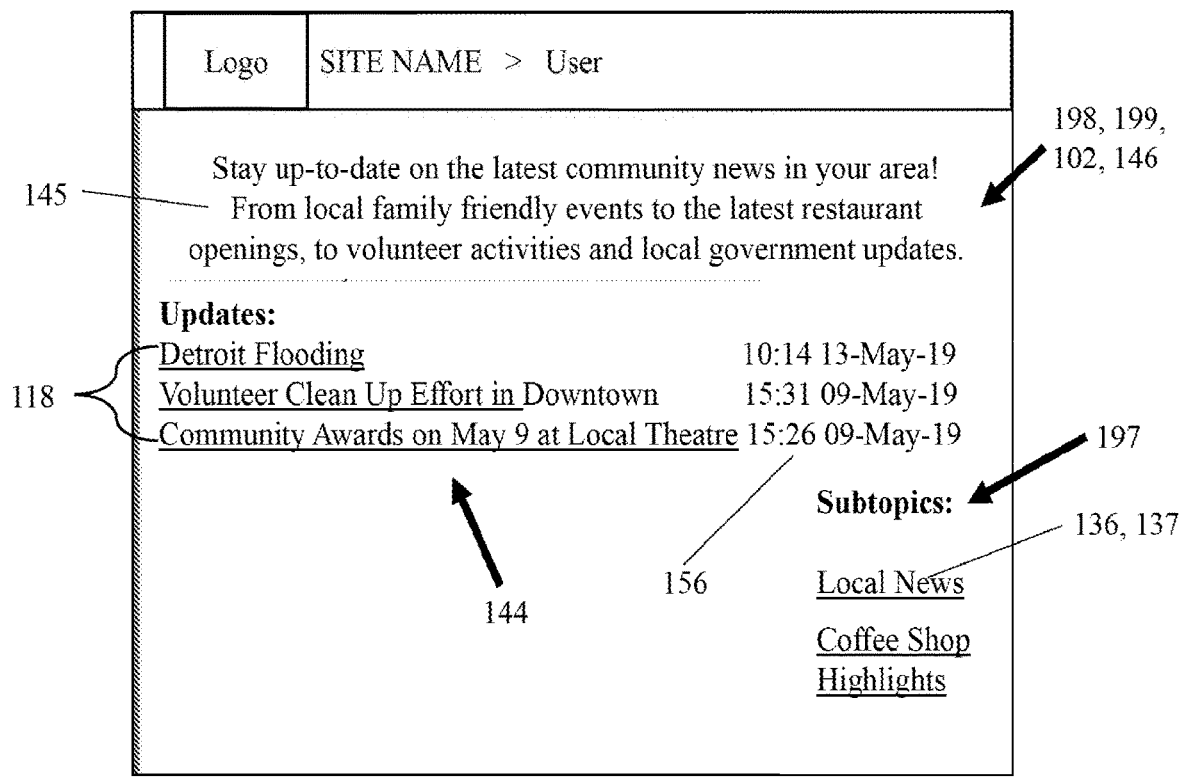
FIG. 7 illustrates a homepage of the website via a frontend user interface.

FIG. 7 illustrates a frontend user interface 198 displaying a homepage 199. The frontend user interface 198 is the web view of the website 102. The homepage 199 is formed as an index webpage 146. The index webpage 146 includes a summary 145. The index webpage 146 includes an index listing 144. The index listing 144 of the homepage 199 is all or the most recent webpages 118 added to the website 102.

The webpages 118 in the index listing 144 may be content webpages 192. Thus, an index webpage 146 incorporates content webpages 192 therein. In other words, an index webpage 146 resembles a parent folder 186 and includes links to content webpages 192 included within that same parent folder 196. The index listing 144 may include the webpages 118 in reverse chronological order. The index listing 144 includes the subject 148 and date 156 (e.g., timestamp) of each webpage 118. The homepage 199 also includes a subtopics navigation menu 197. For the homepage 199, the subtopics navigation menu 197 links to each folder 136 that is a direct subfolder 137 from the publish folder 182 of the client 12. As can be seen in this example, these linked folders 136 are the same as the parent folders 186 identified in FIGS. 2 and 3.

Figure 8:
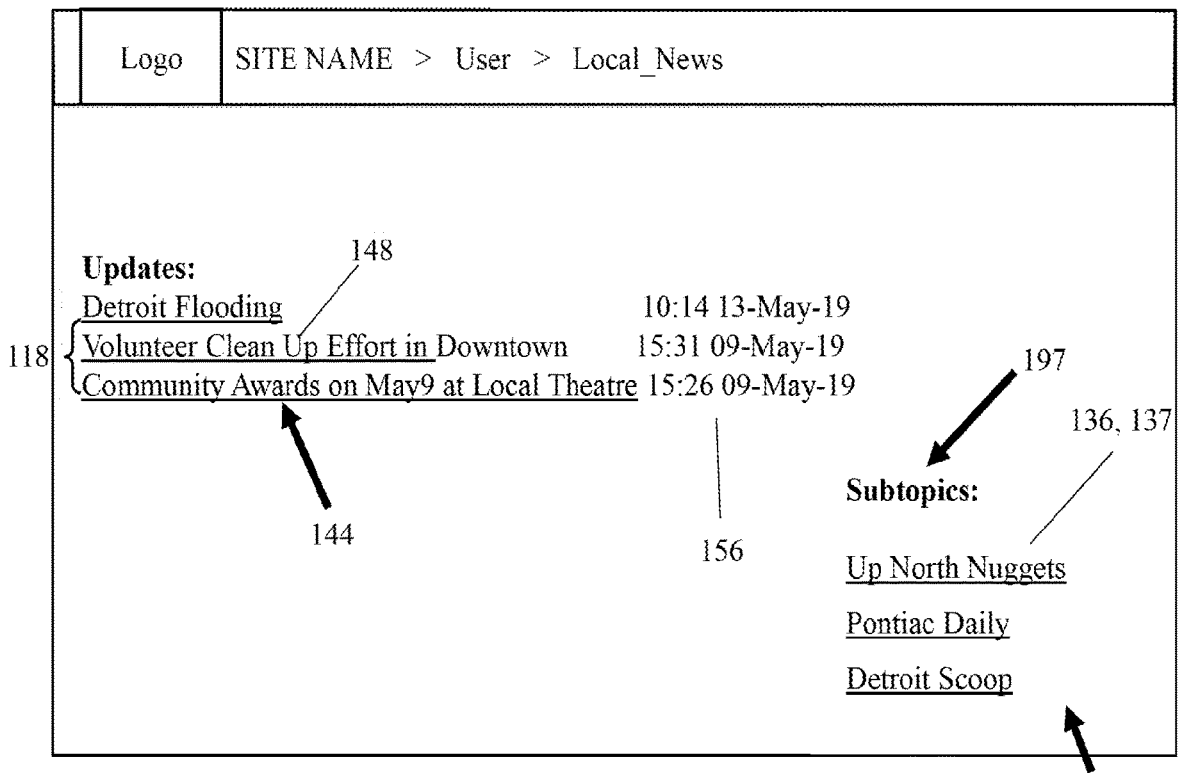
FIG. 8 illustrates a subtopic webpage of the website via a frontend user interface.

FIG. 8 illustrates a frontend user interface 198. The frontend user interface 198 is the web view of the website 102. The frontend user interface 198 is a webpage 118 of a subtopic identified on the homepage 199. The webpage 118 is formatted substantially similar to the homepage 199 of FIG. 7. The webpage 118 is an index webpage 146. The index webpage 146 includes an index listing 144. The webpage 118 also includes a subtopics navigation menu 197. As can be seen in this example, these linked folders 136 are the same as the child folders 188 identified in FIGS. 2 and 3.

Figure 9:
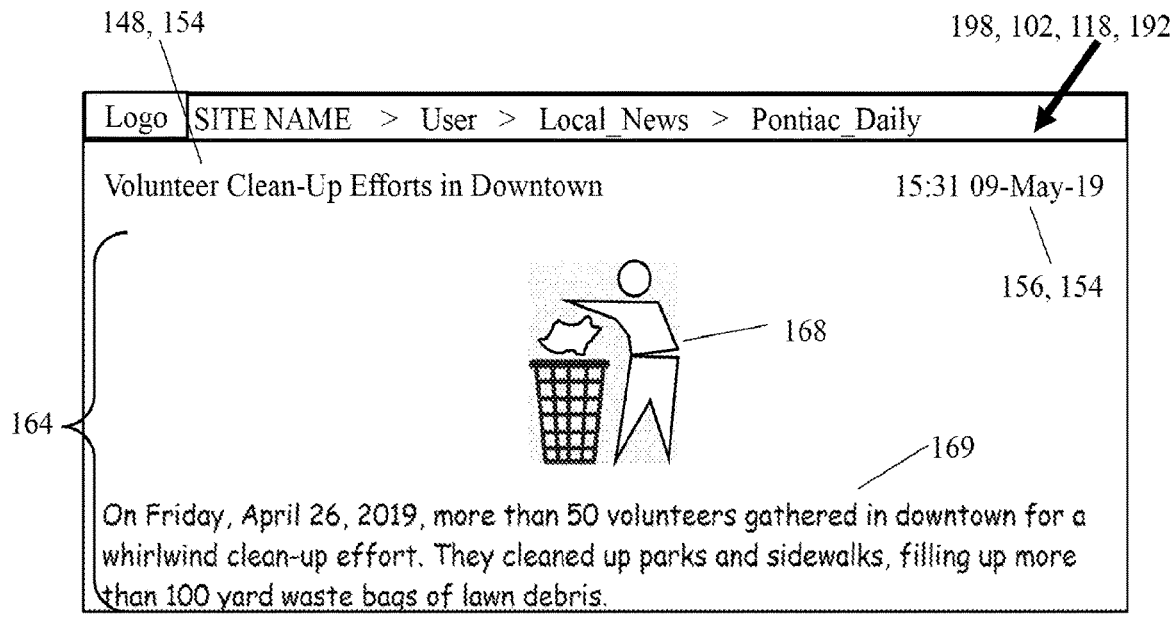
FIG. 9 illustrates a content webpage of the website via a frontend user interface.

FIG. 9 illustrates a frontend user interface 198. The frontend user interface 198 is the web view of the website 102. Specifically, this is a webpage 118 of the website 102. This webpage 118 is a content webpage 192. The content webpage 192 was originally drafted as a draft webpage 106, such as in the format of an email 138. The draft webpage 106 was published and thus became a published webpage 190. The content webpage 192 includes a subject 148 and a date 156 (e.g., timestamp). The subject 148 and date 156 may be referred to as the header 154 of the webpage 118. The subject 148 may be the same as input into the draft webpage 106. The date 156 may be the time the draft webpage 106 was converted into a published webpage 190. The content webpage 192 also includes a body 164. The body 164 includes an image 168 and text 169. As can be seen in this example, formatting from the draft webpage 106 as shown in FIG. 4 carried over to formatting of the published content webpage 192.

Figure 10:
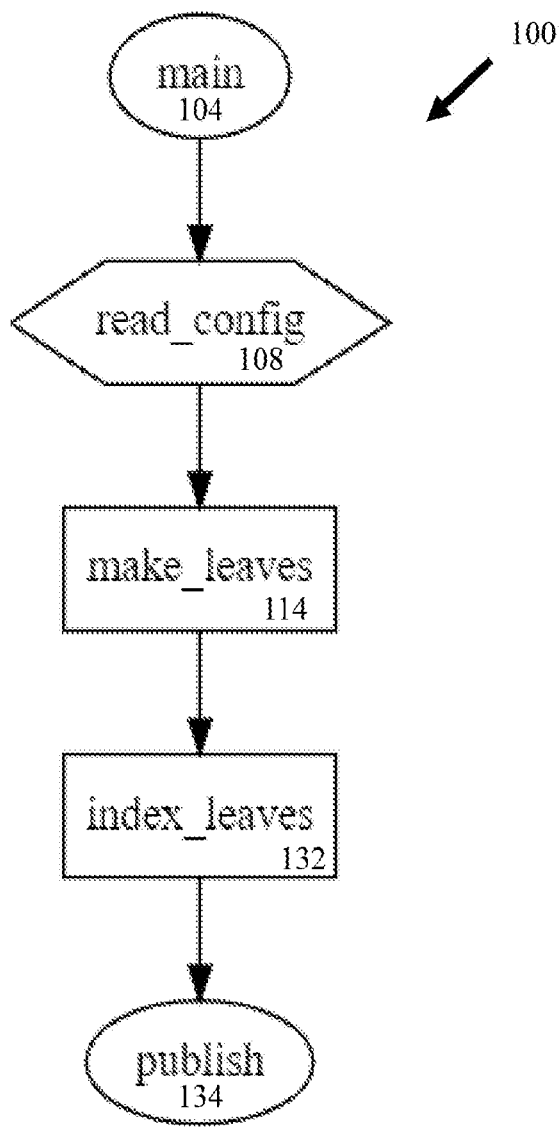
FIG. 10 illustrates a process for updating a dynamic website.

FIG. 10 illustrates an overall process 100 for updating a dynamic website 102 with a dynamic website creation system 10. The process 100 begins at content creation 104. In content creation 104, a content creator creates or updates one or more draft webpages 106 of the website 102. The content creator may create or update the one or more draft webpages 106 via one or more clients 12. After content creation 104, the process 100 goes onto to website configuration 108. The system 10 retrieves configuration parameters 110 for the dynamic website 102. The system 10 uses these configuration parameters 110 to customize the dynamic website with generic content 112 that may be common across a plurality of webpages 106 of the website 102. After website configuration 108, the process 100 moves to content detection and creation 114. During content detection and creation 114, the system 10 detects new content 116. New content 116 may be considered as new or updated draft webpages 106 residing on the client 12. New content 116 may be considered new or updated draft webpages 106 recently moved from a drafts folder 180 to a publish folder 182 in the client 12, but not yet published via a backend user interface 177 or available on a front end user interface 198. Upon detecting new content 116, the system 10 edits or creates one or more webpages 118. The new content 116 and one or more webpages 118 may include one or more existing webpages 120, new webpages 122, or both. Upon creating one or more webpages 118, such as one or more new webpages 122, the system 10 detects if the one or more webpages 118 are intended to be static webpages 124 or indexed webpages 126. Upon detecting one or more static webpages 124, the system 10 may designate the static webpage 124 with a static nomenclature 128. Upon detecting one or more indexed webpages 126, the system 10 may designate the indexed webpage 126 with an indexing nomenclature 130. After creating one or more webpages 118, the system 10 moves on to indexing 132 the one or more webpages 118. During indexing 132, the system 10 may chronologically sort one or more indexed webpages 126 by indexed nomenclature 130. After indexing 132, the system 10 then moves on to publishing 134. During publishing 134, the one or more webpages 118 that have been created or edited are transferred to one or more web servers 38 and accessible via one or more web browsers 48.

Figure 11A:
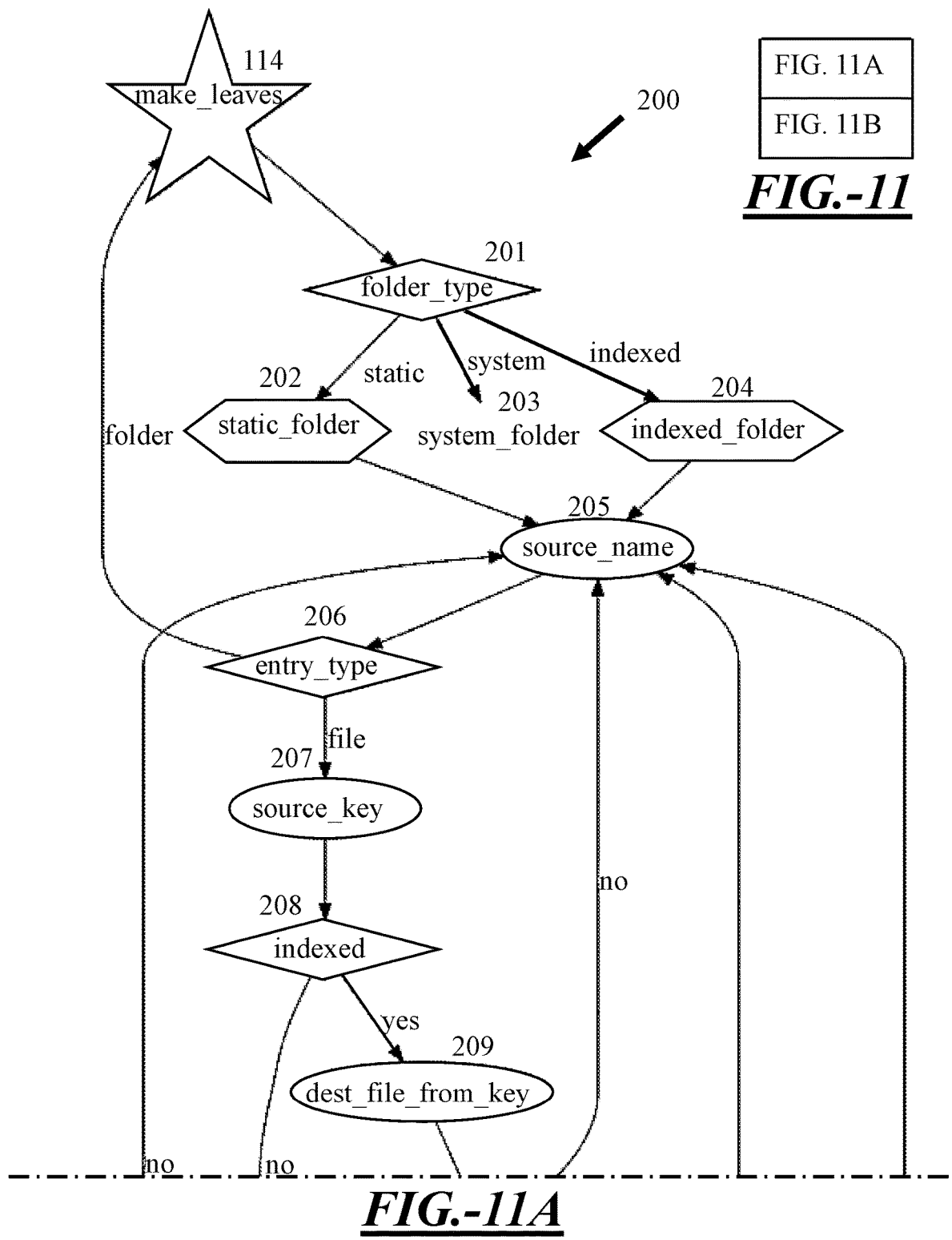
FIG. 11A illustrates a portion of a content detection and creation process.
Figure 11B:
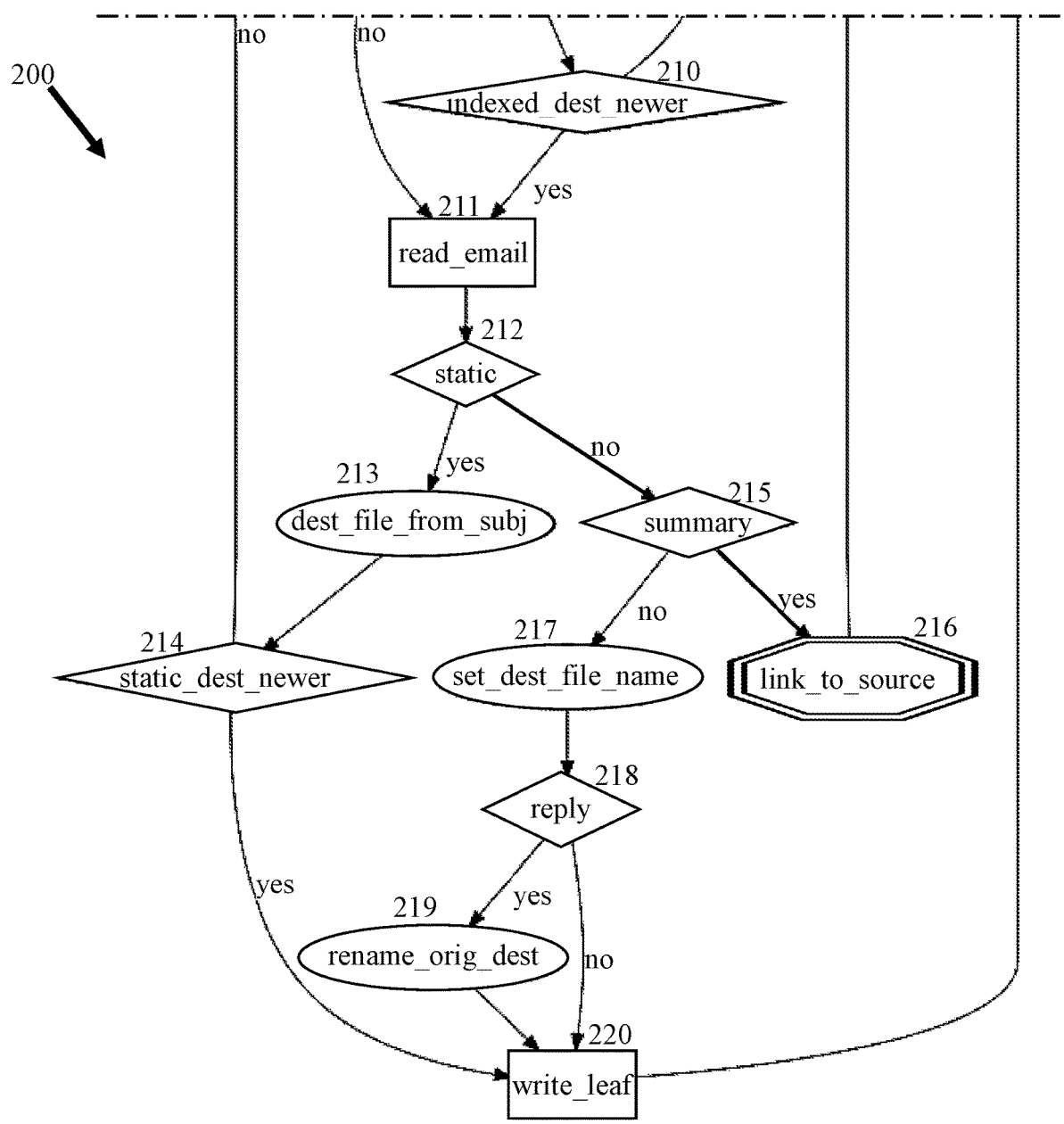
FIG. 11B illustrates a portion of a content detection and creation process continued from FIG. 11A.

FIGS. 11A-B illustrate a content detection and creation process 200 for content detection and creation 114. FIG. 11B is a continuation of FIG. 11A. The process 200 begins with a step of folder identification 201. During folder identification 201, the system 10 looks for folders 136 located on one or more servers 22. The system 10 may follow a depth-first traversal to find the most child folder 188. The system 10 may look for one or more folders 136 located on an IMAP email server 26. During folder identification 201, the system determines the types of the folders 136. The types include static 202, system 203, and indexed 204 folders. The type of folder may be determined by a file extension or format of the folder. For example, system folders 203 may be defined a temporary or new files with a .tmp or .new extension. As another example, static folders 202 and index folders 204 may be defined as cursor files with a .cur extension. Static folders 202 are folders 136 in which the webpages 118 should be processed as static webpages 124. Static webpages 124 may include help pages, about pages, contact us pages, and the like. Indexed folders 204 are folders 136 in which the webpages 118 should be processed as indexed webpages 126. Indexed webpages 126 are webpages 118 which may be chronologically sequenced within a respective folder 136. System folders 203 are folders which reside on the one or more servers 22 but do not contain content for the website 102, and thus are intentionally ignored by the system 10. After folder identification 201 of a folder 136, the system 10 finds an entry 205 within the folder 136. After finding an entry 205 within a folder 136, the system 10 moves to entry identification 206.

During entry identification 206, the system determines if content within a folder 136 is another folder 136 (e.g., subfolder 137) or a draft webpage 106. If the content is another folder 136, the process 200 goes back to the start of content detection and creation 114 and then begins within the identified folder 136. As such, this provides for a depth-first traversal until the content within a folder 136 is a draft webpage 106 as opposed to another subfolder 137. A draft webpage 106 may be stored within the server 22 as an email 138. If a draft webpage 106 is detected, then system 10 moves on to nomenclature assignment 207. During nomenclature assignment 207 an indexed nomenclature 130 or static nomenclature 128 is assigned to the draft webpage 106. The nomenclature assignment 207 is determined based on the type of folder 136 in which the draft webpage 106 resides. For example, if the draft webpage 106 resides within a static folder 202, the draft webpage 106 is assigned a static nomenclature 128 and if the draft webpage 106 resides within an indexed folder 204, the draft webpage 106 is assigned an indexed nomenclature 130. The nomenclature may include a sequence number, randomly assigned number, timestamp (e.g., date and time of publishing), webpage subject 148, a name of the folder 136 in which the webpage 106 resides, or the like. Indexed nomenclature 130 may particularly benefit from a timestamp and/or sequence associate to aid in the chronological sequencing later in the process.

After nomenclature assignment 207, the system 10 then moves on to an indexing determination 208. During indexing determination 208 the system 10 determines if the draft webpage 106 has been assigned an indexed nomenclature 130. If an indexed nomenclature 130 is present, then the system 10 moves on to destination determination 209. Destination determination 209 determines a destination file 140 for the draft webpage 106. Destination determination 209 is based off of the data presented within the indexed nomenclature 130. Exemplary data presented within an indexed nomenclature 130 may include a time stamp, folder location, sequence number, and the like. Thus, the indexed nomenclature 130 identifies in what folder 136 and even index webpage 146 a link to the draft webpage 106 should reside and in what order it should be placed within an index listing 144 of an index webpage 146. After destination determination 209, the system 10 moves on to a newness determination 210. At newness determination 210, the system 10 determines if the draft webpage 106 with indexed nomenclature 130 is newer than the destination file 140. The newness determination 210 is completed by comparing the indexed nomenclature 130 of the draft webpage 106 to the existence of a destination file 140, a nomenclature 142 of the destination file 140, or both. For example, if the destination file 140 does not exist, then the draft webpage 106 is newer than the destination file 140. As another example, if the indexed nomenclature 130 shows the draft webpage 106 has a later (e.g., newer) timestamp in the indexed nomenclature 130, the draft webpage 106 is newer than the destination file 140. After newness determination 210, the process 200 moves on to reading the file 211. During reading the file 211, the system 10 reads data contained within the draft webpage 106 which may be in the form of an email 138. The data within the draft webpage 106 may include publication time, subject, whether or not it is considered a reply to a previous draft webpage 106 or email 138, the content within a body of the draft webpage 106, attachments to the draft webpage 106, and the like. Additional details about reading the file 211 can be found in FIGS. 13 and 14. After reading the file 211 or even simultaneous with the indexing determination 210, the process 200 may move on to a static determination 212.

During static determination 212, the draft webpage 106 is evaluated to determine if it is a static webpage 124. If the draft webpage 106 resides within a folder 136 which has been designated as a static folder, the draft webpage 106 is determined to be a static webpage 124. If after static determination 212 the draft webpage 106 is determined to be a static webpage 124, then the process 200 moves on to a static destination determination 213. During static destination determination 213, the system 10 determines the destination file 140 by a subject 148 of the draft webpage 106. For example, the destination file 140 is determined solely based on the subject 148 and does not incorporate timestamp or other sequencing information. At this time, a static nomenclature 128 may be assigned to the draft webpage. The static nomenclature 128 may just be a subject 128 and the folder(s) 136 in which the draft webpage 106 resides. The combination of the subject 128 and the folder(s) 136 may designate the destination file 140. After static destination determination 213, the system moves on to newness determination 214. During newness determination 214, the process determines if the draft webpage 106 is newer than a destination file 140. Newer may mean that the destination file 140 does not yet exist or was earlier published. If the draft webpage 106 is newer than its destination file 140 then the process 200 moves on to a step of creating or re-creating a webpage 220. For creating a webpage 220, the webpage 119 may be created using the naming of the destination file 140 determined in step 213. For recreating the webpage 220, the newer draft webpage 106 may overwrite the previously published webpage sharing the same destination file. During creating a webpage 220, the process converts the draft webpage 106, which may be in the form of an email 138, into the form of a webpage 118 that is not published (e.g., not available on a web browser).

If during static determination 212, the system 10 determines that the draft webpage 106 is not a static webpage 124 but rather an indexed webpage 126, the process 200 may move on to a summary determination 215. During the summary determination 215, the system 10 determines if the draft webpage 106 includes a summary 145. Summary determination 215 may be based off the subject 148 of the draft webpage 106 or email 138. For example, as illustrated FIG. 7, a summary 145 may be part of a subject 148. If during summary determination 215, the system 10 determines the draft webpage 106 is an index webpage 146 with a summary 145, then a summary 145 is intended to be incorporated into the body 164 of the webpage 118 in addition to an index listing 144. If after summary determination 215 it is determined that the draft webpage 106 is a content webpage 192 and no summary 145 is needed, the process 200 moves on to setting destination file name 217 for the draft webpage 106. Setting destination file name 217 may create a destination file 140. The destination file 140 may be a combination of an indexed nomenclature 130, subject 148 of the draft webpage 106, and even the folders 136 in which the draft webpage 106 resides. After setting destination file name 217, the process 200 may move on to a reply determination 218. If the draft webpage 106 is determined to be a reply to a previous webpage 118 of the same subject 148, the system moves on to destination renaming 219. During destination renaming 219, the original destination file 140 is renamed to the new destination file 140 determined during setting destination file name 217. After destination renaming 219, the process may move on to the step of creating a webpage 220. If during the summary determination 215 it is determined a summary 145 is necessary because the draft webpage 106 is an index webpage 146 with a summary 145, the process 200 may move on to linking 216. During linking 216, the system 10 may create a link to the index webpage 146 that is saved within a website directory. After linking 216, the process 200 may go back to finding an entry 205. After creating a webpage 220, the process 200 may go back to finding an entry 205. And thus, the process 200 may search for folders 136 and draft webpages 106 which should be created or updated as webpages 118 ready for publishing onto a web server 38 and accessible by web browsers 48.

Figures 12A, 12B:
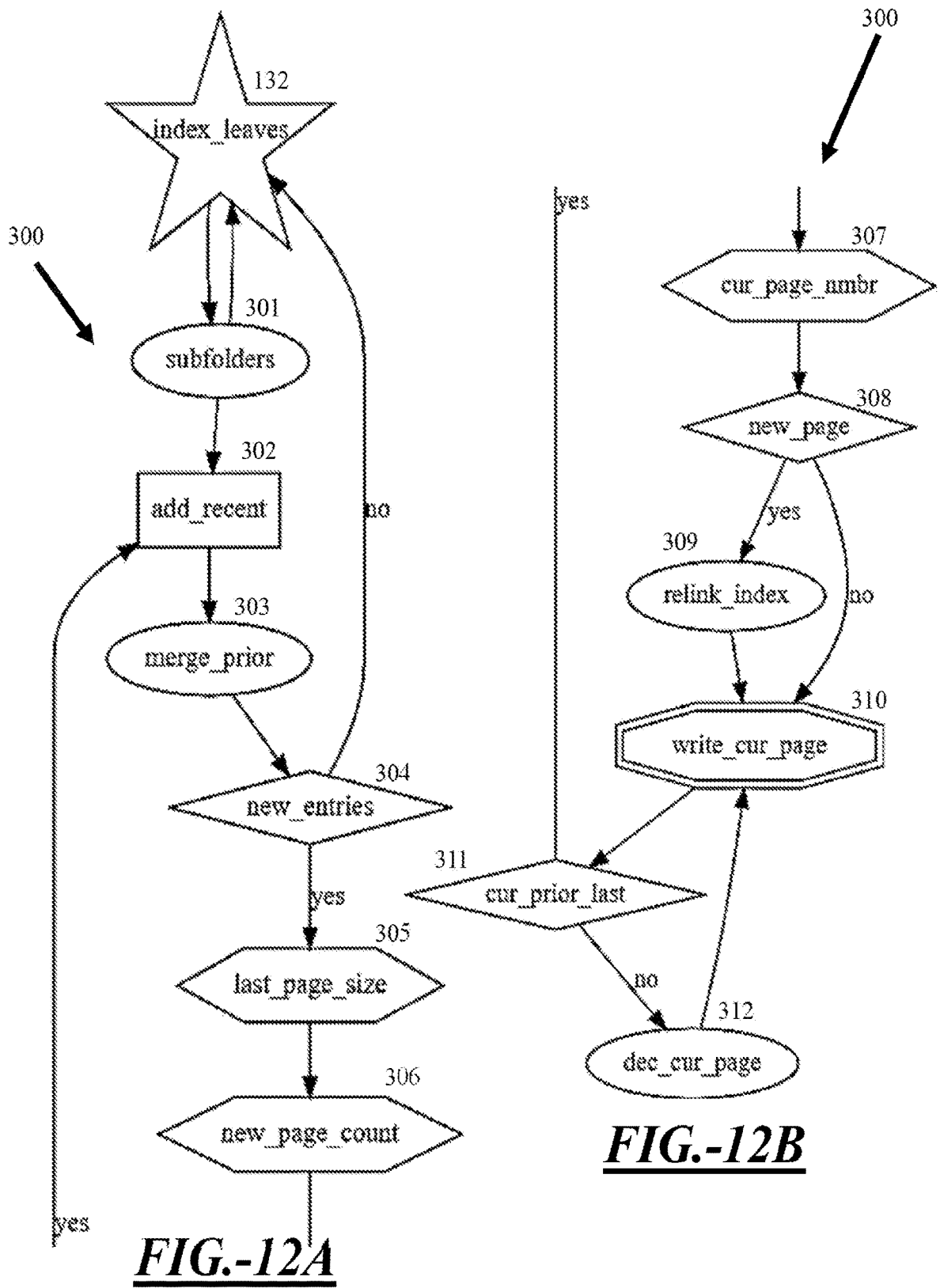
FIG. 12A illustrates a portion of an indexing process.
FIG. 12B illustrates a portion of an indexing process.

FIGS. 12A-B illustrate a sub-process 300 for indexing 132. FIG. 12B is a continuation of FIG. 12A. At the start of indexing 132, the system 10 first completes a subfolder search 301. During the subfolder search 301, the system 10 searches for all subfolders 137 which may be stored on a server 22. The subfolder search 301 may be completed in a depth-first traversal, thus finding the furthest subfolder 137 (e.g., a child folder 188 of a parent folder 186 which does not have a subsequent child folder 188). After the subfolder search 301, the process 300 moves to link creation 302. During link creation 302, the process 300 creates links for each content webpage 192 to be included on an index webpage 146 (e.g., content webpages 192 residing with a same folder 136 as an index webpage 146). An exemplary process for link creation 302 is provided in further detail in FIG. 15. After link creation 302 there is content merging 303. In content merging 303, the process 300 merges content webpages 192 within a common folder 136. After content merging 303, the process 300 moves on to new entry determination 304. During new entry determination 304, the process 300 identifies if there are new draft webpages 106 within a folder 136, which may be indexed webpages 126. If there are no new draft webpages 106 within the folder 136, the process 300 reverts back to the beginning of indexing 132 and moves on to a subsequent subfolder 137 that is either lateral with or higher in hierarchy (e.g., parent folder 186) than the subfolder 137 just indexed.

If there are new draft webpages 106 identified in new entry determination 304, the process moves on to last page quantity determination 305. During last page quantity determination 305, the system 10 determines the number of indexed webpages 126 in the most recently published index webpage 146. From last page quantity determination 305, the process 300 moves on to a new page quantity determination 306. During new page quantity determination 306, the process 300 determines the number of draft webpages 106 within a same folder 136 or subfolder 137 which are indexed webpages 126 and considered new (e.g., have not yet been published as webpages 118 onto the web server 38). After new page quantity determination 306, the process then moves on to current page quantity determination 307. During current page quantity determination 307, the process 300 determines what the updated quantity of webpages 118 is per subfolder 137 and sharing a common index webpage 146. The updated quantity of webpages 118 may include already published webpages 118 and draft webpages 106 defined as indexed webpages 126. After the current page quantity determination 307, the process 300 moves on to a new page relink decision 308. During the new page relink decision 308, the system 10 determines if the current page quantity is the same or different than the last published page quantity. If the quantities are different, then the new page relink decision 308 moves to relinking the index 309. During relinking the index 309, an index listing 144 within an index webpage 146 is updated to show links for each new indexed webpage 126 within the same folder 118. If the quantities are the same, or after relinking the index 309, the process 300 moves on to index webpage creation 310. During index webpage creation 310, formatting is carried over to the index webpage 146, including an index listing 144. After index webpage creation 310, the process 300 moves on to exit subfolder decision 311. During the exit subfolder decision 311, if the current page quantity from the current page quantity determination 307 is the same as the former most recent index webpage 146, then the process exits that particular subfolder and continues on to the next subfolder starting at link creation 302. If during the exit subfolder decision 311, the current page quantity from the current page quantity determination 307 is different than the former most recent index webpage 146, the process 300 moves on to page quantity updating 312. During page quantity updating 312, the current page quantity is updated and the process 200 may revert back to index webpage creation 310.

Figure 13:
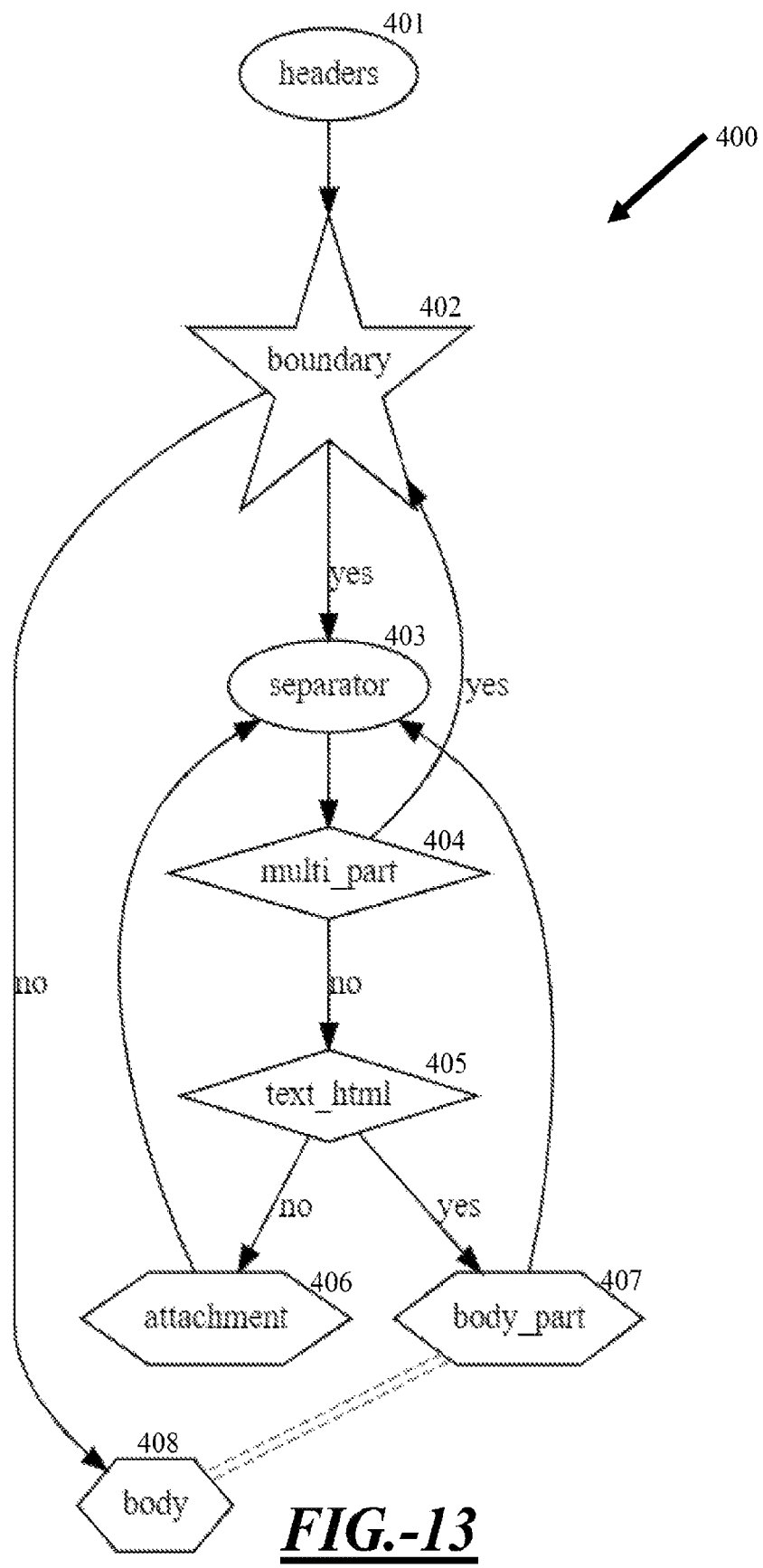
FIG. 13 illustrates a reading process.

FIG. 13 illustrates a reading process 400. The reading process 400 may be the detailed process for reading the file 211 as exemplified in FIGS. 11A-B. During the reading process 211, the system 10 reads data contained within a draft webpage 106 which may be in the form of an email 138. The reading process 400 begins with header reading 401. During header reading 401, the system 10 reads a header 154 of a draft webpage 106. The draft webpage 106 may be in the format of an email 138. The header 154 may include a subject 148, date 156 (e.g., time stamp), in-reply-to 158, content-transfer-encoding 160, and even content type 162. After header reading 401, the process 400 moves on to a boundary determination 402. During boundary determination 402 the system 10 determines if the draft webpage 106 has a multi-part content type. If the draft webpage 106 does not have a multi-part content type, the process 400 moves on to body reading 408. Body reading 408 may consist of reading a body 164 of a draft webpage 106. The body 164 may include one or more images 168, text 169, hyperlinks 170, and the like.

If the draft webpage 106 is a multi-part content type, the process 400 moves on to separator finding 403. During separator finding 403, the system 10 looks for content separators, such as a boundary value, to separate one portion having one content type from another portion having another content type in the draft webpage 106. Different content types may include: HTML, text, and the like. After identifying a content separator in separator finding 403, the system 10 moves on to multi-part determination 404. If the draft webpage 106 has a multi-part content type, the process 400 moves back to a boundary determination 402. Thus, each content-type and separator is identified before moving past multi-part determination 404. If the draft webpage 106 is not a multi-part content type or once each content type and separator has been identified, the process moves on to a decoding step 405. During the decoding step 405, if the content type of the draft webpage 106 is not text or html, then the process 400 moves on to attachment recognition 406. During attachment recognition 406, the system 10 determines if a part of an email as an attachment 166. During the decoding step 405, if the content type of the draft webpage 106 is text or html, then the process 400 moves to body part recognition 407. During body part recognition 407, the system 10 notes a body of a part of a multi-part draft webpage 106. After attachment recognition 406 or body part recognition 407 for a multi-part content type draft webpage 106, the process 400 moves back to separator finding 403. The reading process 400 allows for each portion of a draft webpage 106 to be found, identified, and stored for future publication.

Figure 14:
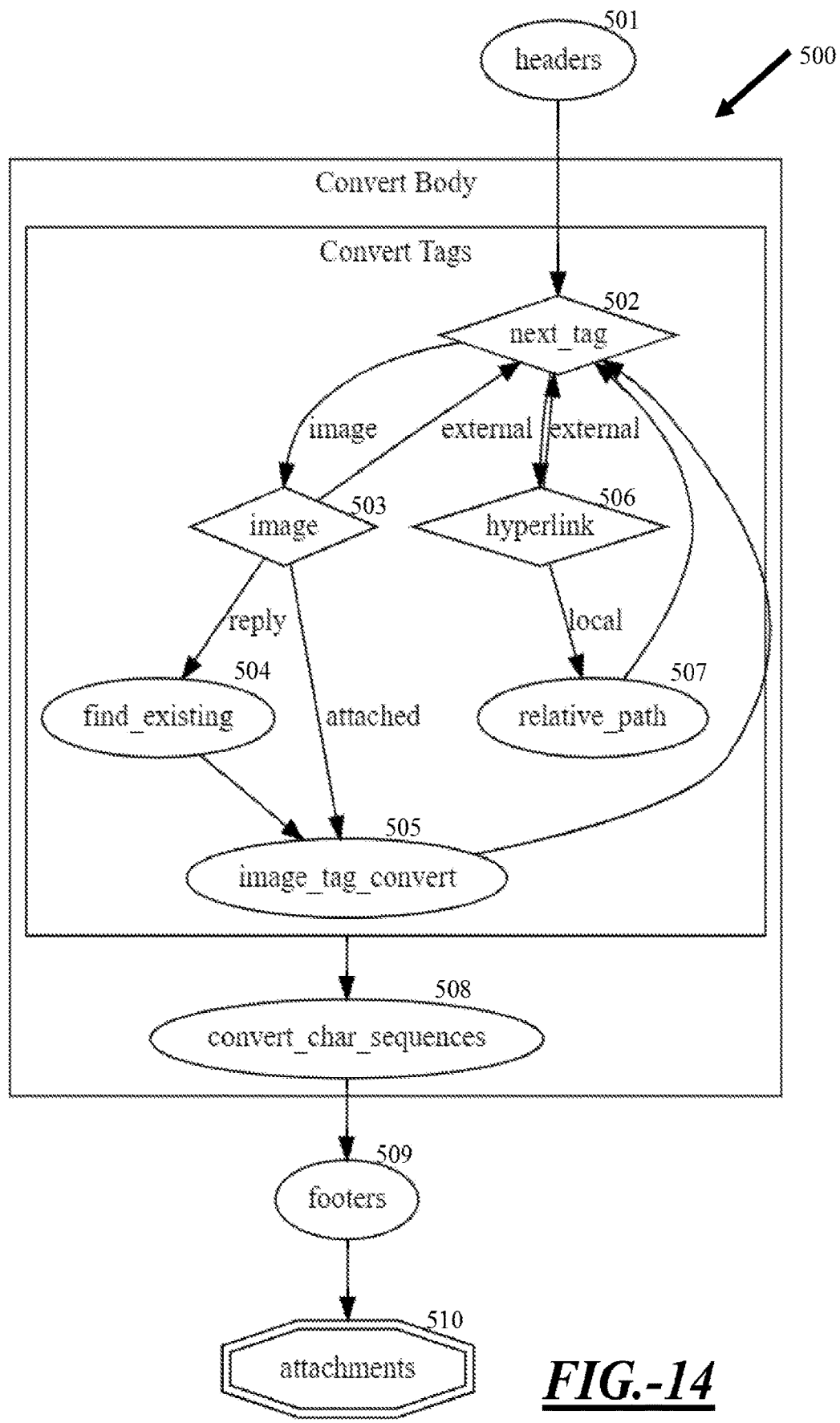
FIG. 14 illustrates a webpage publication process.

FIG. 14 illustrates a webpage publication process 500. The publication process 500 may be synonymous or after creating a webpage 220 as exemplified in FIGS. 11A-B. The publication process 500 begins with header writing 501. Header writing 501 may include creating a header 154 of a webpage 118 using the data contained within a header 154 of a draft webpage 106. A header 154 may include a subject 148, date 156, and the like. After header writing 501, the process 500 moves on to HTML tag finding 502. During HTML tag finding 502, the system 10 find and notes an HTML tag in the body 164 of a draft webpage 106. An HTML tag may identify the start of the body 164, end of the body 164, one or more images 168 within the body 164, text within the body 164, a hyperlink 170 within the body 164, and the like.

If the HTML tag is determined to be an image 168, the process 500 moves on to image location determination 503. During image location determination 503, the system 10 determines a location of the image 168. The location of the image 168 may be within an attachment 166, within a body 164, within a draft webpage 106 noted as a reply message, or other options. If the draft webpage 106 being published is a reply to a previous draft webpage 106 or webpage 118, the system 10 moves on to finding the location 504 of the image 168 in the previous (e.g., original) draft webpage 106 or webpage 118. Once the image 168 is located, the process 500 moves on to image location modification 505. If the image 168 was identified as an attachment 166 to a draft webpage 106, the process 500 moves to image location modification 505. During image location modification 505, the system 10 modifies an HTML tag to identify the attachment 166 or the originating file to which a reply is made to.

If during HTML tag finding 502, the HTML tag is determined to be a hyperlink 170, the process 500 moves on to hyperlink address determination 506. During hyperlink address determination 506, the system 10 determines if the hyperlink 170 refers to a local or external link. If the hyperlink 170 refers to an external link, the system 10 does not modify the link and loops back to HTML tag finding 502 for the next HTML tag. If the hyperlink 170 refers to a local link, the process moves on to relative path modification 507. During relative path modification 507, the system 10 modifies the hyperlink 170 to refer to the local file. After relative path modification 507, the process goes back to HTML tag finding 502.

After image location modification 505, the process moves on to character conversion 508. During character conversion 508, the system 10 converts multi-bite sequences from within a draft webpage 106 into their HTML encodings. After character conversion 508, the process moves on to footer creation 509. During footer creation 509, the system 10 writes the body 164 to a published webpage and appends footers 172. The footers 172 may have been configured during website configuration 108, such as illustrated in FIG. 10. After footer creation 509, the process 500 moves on to attachment writing 510. During attachment writing 510, the system 10 creates or even overwrites attachment data previously found, such as during attachment recognition 406 in FIG. 13.

Figure 15:
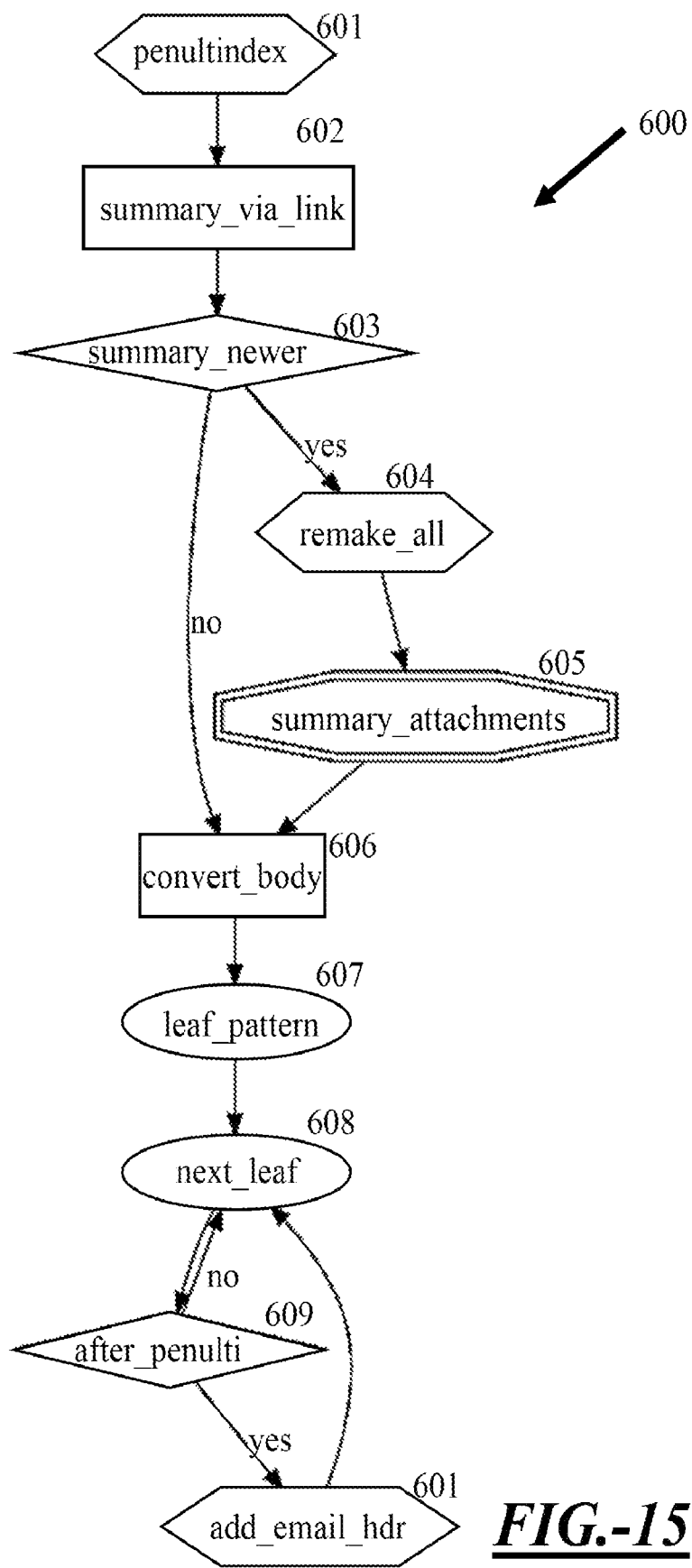
FIG. 15 illustrates a directory indexing process.

FIG. 15 illustrates a process for directory indexing 600. Directory indexing 600 may be a detailed subprocess for link creation 302 as exemplified in FIGS. 12A-B. Directory indexing 600 occurs when a draft webpage 106 is published, such that it may be available on a web server 38. Directory indexing 600 begins by penultimate index determination 601. During penultimate index determination 601 the system 10 determines a timestamp of the most recent published index webpage 146 associated with a folder 136. Based on knowing the timestamp, the system 10 knows to look for newer timestamps for updating the index webpage 146. After penultimate index determination 601, the process 600 moves on to summary reading 602. Summary reading 602 may occur via header reading 401, such as described within the reading process 400 of FIG. 13. Summary reading 602 may occur by reading a header 154 identified via linking 216 as described in a process for content detection and creation 200. After summary reading 602, the process 600 moves on to summary newness determination 603. If during summary reading 602 it is found that an index listing 144 is not newer than the timestamp found during penultimate index determination 601, the process 600 moves on to body conversion 606. If the index listing 144 is newer than the time stamp found during penultimate index determination 601, the process 600 moves on to index remaking 604. During index remaking 604, one or more index webpages 146 are updated to reflect newer webpages 118, including subject 148 and date 156 (e.g., time stamp). After index remaking 604, the process 600 moves on to summary updating 605. After summary updating 605, the process 600 moves on to body conversion 606. During body conversion 606, the system reads a body 164. For example, the body 164 may be read such as in the reading process 400. The index webpage 146 is then updated based on the body conversion 606 such that a link to the newest webpage 118 is located at the top. After body conversion 606, the process 600 moves on to file pattern creation 607. During file pattern creation 607, the system 10 sorts the links of an index webpage 146 based on their time stamps, such as in reverse chronological order (e.g., newest to oldest). After file pattern creation 607, the process 600 moves on to next page reading 608. During next page reading 608, the system 10 reads a header 154 of the next oldest webpage 118 and notes a time stamp of that page on the index webpage 146. After next page reading 608, the process 600 moves on to post penultimate indexing 609. After post penultimate indexing 609, the process 600 moves on to index webpage updating 610. During index webpage updating 610, the system 10 updates the index listing 144 of an index webpage 146 to include a subject 148 and time stamp of the most recent webpage 118 and published.

Examples

The following examples are provided to illustrate the teachings herein, such as those of the illustrative examples, but are not intended to limit the scope thereof. The following examples may provide working examples of the system and methods of the disclosure.

An exemplary network 1 used in creating and editing a dynamic website is illustrated in FIG. 1. The network 1 includes:
 a. One or more clients 12 for content creation. Specifically, various IMAP clients 14, any of which could be used to create and modify content stored on the imap server.
 b. imap server 24: Dovecot is used in the reference implementation, but the standardized IMAP protocol means that any implementation could be used.
 c. i2b server 10, 24: It may (and does in the reference implementation) reside on the same physical machine as the imap server, thereby using filesystem access. If on a separate machine, read access can be performed via standardized protocols such as IMAP or rsync.
 d. One or more web servers 38 for publication: Copies the html and image files generated by the invention to one or more web servers using the standard rsync utility.

An exemplary process 100 for creating and editing a dynamic website is illustrated in FIG. 10. The process 100 includes:
 a. Step 104—Main: represents the starting point where content in individual emails may be stored in IMAP folders, ready to be processed.
 b. Step 108—read_config: retrieval of configuration parameters which any blogging software may use to customize and integrate generic content.
 c. Step 114—make_leaves: the first of two broad parts of the dynamic website creation system where the software detects new content and creates corresponding new web leaf pages, naming them in a way that is efficient for later indexing.
 d. Step 132—index_leaves: the second part of the dynamic website creation system, which efficiently updates the index webpages that allow for blog navigation between leaf pages created in 220. Older index webpages may need not to be changed or regenerated, making the system suitable for high-volume blogs.
 e. Step 134—Publish: the last step of blogging software. The dynamic website creation system allows for easy and efficient use of standard unix tools (rsync and sendmail, in the reference implementation) to accomplish this task.

An exemplary content detection and creation process 200 as illustrated in FIGS. 11A-B. The process 200 includes:
 a. Step 114—make_leaves: recursive entry point for detail on Step 114 in FIG. 10.
 b. Step 201—folder_type: identification of the source folder type on the IMAP server. In the reference configuration of dovecot, system folders are named "tmp" or "new" while non-system folders containing content are subfolders named "cur" of any other folder name. The system 10 detects new non-System folders, allows the user to specify them as Static or Indexed, storing the designation in the corresponding destination web directory. In some configurations Static and Indexed folders can automatically be identified by content placed in them.
 c. Step 202—static_folder: notes that files in this folder are to be processed into static web pages. Most blogs incorporate pages, such as help files, which are not indexed content. Such files are processed differently from indexed content, resulting in easier to read and reference web page file names and URLs.
 d. Step 203—system_folder: IMAP System folders are ignored by the system 10.
 e. Step 204—indexed_folder: notes that files in this folder contain serial content which is to be automatically added to index webpages for easy updating of the blog.
 f. Step 205—source_name: this step reads an entry from the IMAP source folder.
 g. Step 206—entry_type: determines whether the entry just read is a subfolder or email file.
 h. Step 207—source_key: forms a unique Key from the source entry which uniquely identifies a source email file and its corresponding web leaf, if the source is to be indexed. In the dovecot reference implementation this is a combination of a time stamp, random number, and, on multi-server systems, the host name.
 i. Step 208—indexed: changes the course of processing based on the earlier folder_type from step 201.
 j. Step 209—dest_file_from_key: if the file is in an indexed folder, determine the destination file from the source key.
 k. Step 210—indexed_dest_newer: determine if the source file is newer than the destination. If the destination does not exist, it is. If not, proceed to the next source which typically eliminates the need to process of most files on the server. Configuration (from step 108) may also specify that all files should be remade to effectively skip this step in order to implement site-wide changes.
 l. Step 211—read_email: read the email file, noting attributes including the Publication Time, Subject and whether or not it is a Reply to an earlier email from the header. Main Content and Attachments are noted from the rest of the email. See exemplary detail in FIG. 13.
 m. Step 212—static: If folder type in Step 201 was noted as static in Step 202.

n. Step 213—dest_file_from_subj: If folder type is static, form the destination Static web page file name solely from the Subject of the email.
o. Step 214—static_dest_newer: determine if the source file is newer than the Static destination. If the destination does not exist, it is. If not, proceed to the next source. Configuration (Step 108) may also specify that all files should be remade to effectively skip this step in order to implement site-wide changes.
p. Step 215—summary: if 212 is Indexed, check the Subject to see if this is a Summary to be included in Index Files for this folder. In the reference implementation this is indicated with a blank or "index" subject.
q. Step 216—link_to_source: if the file is a Summary per 215, link to it in the destination directory for later efficient processing when indexing.
r. Step 217—set_dest_file_name: if not a Summary per 215, form the destination web file name from the Key and the Subject.
s. Step 218—reply: Determine if email is a reply email from attributes collected during Step 211.
t. Step 219—rename_orig_dest: if email is reply, rename the original destination file to the name formed in 217 for overwriting.
u. Step 220—write leaf: (over)write the destination leaf page using the name formed in 219 or 213. See FIG. 14 for detail.

An exemplary indexing process 300 for indexing 132 as illustrated in FIGS. 12A-B. The process 300 includes:
a. Step 132—index_leaves: recursive entry point for detail in Step 132 of FIG. 10.
b. Step 301—subfolders: find all subfolders and re-enter processing to index them first (depth-first traversal).
c. Step 302—add_recent: create a link and internal record for each content page to be included in index webpages that need updating. See FIG. 15 for detail.
d. Step 303—merge_prior: after processing subfolders, merge the content records into those for this parent folder.
e. Step 304—new_entries: if there are no entries newer than the last index file at this folder level, exit to the parent, otherwise proceed with 305.
f. Step 305—last_page_size: determine the number of entries in the last (most recent) index webpage. This is the configured (from Step 108) page size plus modulus of the number of entries (content pages) that are newer than the penultimate index webpage (as determined in FIG. 15 and process 600).
g. Step 306—new_page_count: the integer result of the division of number of entries that are newer than the penultimate index webpage by the page size.
h. Step 307—cur_page_nmbr: the new page count (from Step 306) plus the last index webpage number.
i. Step 308—new_page: if new_page_count is zero, indexing process only rewrites the last index webpage and skips the next step.
j. Step 309—relink_index: if new_page_count is non-zero, overwrite the index.html symlink that points the web server to the default (most recent index) page for this folder.
k. Step 310—write_cur_page: (over)write configured header, summary (from indexing process 600), entries, and footers into an index file with cur_page_nmbr (Step 307) in the name.
l. Step 311—cur_prior_last: if cur_page_nmbr (Step 307) is the former most recent index webpage number, exit this (sub)folder and continue with the next, resuming at Step 302.
m. Step 312—dec_cur_page: otherwise decrement cur_page_nmbr and go back to Step 310.

An exemplary reading process 400 as illustrated in FIG. 13. The process 400 includes:
a. Step 401—headers: read email headers noting standard values such as Subject, Date, In-Reply-To, Content-Transfer-Encoding, and Content-Type. If Content-Type is multipart, note the Boundary value.
b. Step 402—Boundary: recursive entry-point for processing emails with "multipart" Content-Type. Otherwise decode the rest of the email, noting the body.
c. Step 403—separator: If the Content-Type in Step 401 is "multipart", look for the current boundary value in the email, then process headers for the section looking for its Content-Type.
d. Step 404—multi_part: If the Content-Type in Step 401 is "multipart", recurse back into Step 402 with the associated new boundary value.
e. Step 405—text_html: otherwise, if the Content-Type from Step 401 is "text/html" decode and note the Body in Step 406.
f. Step 406—attachment: If the Content-Type is not "multipart" or "text/html" from Step 401, note the binary data in this section as an Attachment, then return to Step 403 to process other sections.
g. Step 407—body_part: note the Body from this section, then return to Step 403 to process other sections.
h. Step 408—note the Body part from the entire remainder of the email, using processing equivalent to the section processing in 407.

An exemplary website publication process 500 as illustrated in FIG. 14. The process 500 includes:
a. Step 501—headers: write standard headers configured in Step 108 such as part of FIG. 10.
b. Step 502—next_tag: find and note the next HTML tag in the body. In addition to the processing below, this step may also perform HTML scrubbing by eliminating the entire tag contents from output if the tag is of a configured (in Step 108) blacklisted type such as "script".
c. Step 503—image: if the tag type noted in Step 502 is "image" then look at the "source" attribute to determine the image location. If the value associated with the source attribute is "cid:" then the image is contained in one of the Attachments noted in Step 406; note the filename and proceed to Step 504. If the value begins with "imap:" and this email is a Reply then the image file was already written when the original email was processed; find that filename using the key, "filename" and extension data in the rest of the value in Step 504 and proceed to Step 505. If the value begins with "http" the image is external; loop back to Step 502 with no modification of this tag.
d. Step 505—image_tag_convert: modify the tag link to point to the filename noted in the prior step, Step 503.
e. Step 506—hyperlink: if the tag found in Step 502 is a link tag, look at the href attribute and determine if the link target is a domain configured as local in Step 108. If not, loop back to Step 502 without modifying the tag, otherwise proceed to Step 507.
f. Step 507—relative_path: modify the tag to point to the local content file, then loop back to Step 502.

g. Step 508—convert_char_sequences: convert multi-byte sequences from the email into their html encodings.
h. Step 509—footers: write the converted body and append footers configured in Step 108.
i. Step 510—attachments: (over)write the binary Attachment data noted in step(s) 406 to separate files.

An exemplary directory indexing process 600 as illustrated in FIG. 16. The process 600 includes:
a. Step 601—penultindex: determine the file pointed to by the index.html link, parse out the sequence number, decrement, and determine the time stamp on the resultant (penultimate) index file. This time stamp determines the default pattern for the files we need to read for new indexes, rather than inefficiently scanning the whole directory.
b. Step 602—summary_via_link: read the headers of the file pointed to by the summary link that was created in step 216, using the process detailed in FIGS. 11A-B.
c. Step 603—summary_newer: the time stamp on the summary file will typically be older than the one from the penultimate index in step 601. If so, only the last index file needs to be remade, so jump to step 606.
d. Step 604—remake_all: if not in the step above, we need to remake all indexes, otherwise only the last one needs to be remade.
e. Step 606—convert_body: read the body of the file pointed to by the summary link that was created in step 216, using the process detailed FIG. 14. This goes at the top of each new index webpage.
f. Step 607—leaf_pattern: form the appropriate pattern of files to read based on the time stamp from step 601 or 604.
g. Step 608—next_leaf: read only the header of the next leaf file in descending order by the time stamp at the beginning of its file name and note the actual time stamp of the file.
h. Step 609—after_penulti: since the pattern from step 606 may be an inexact optimization, if not remake_all, determine if the time stamp for this file is newer than the one from step 660100. If not, ignore this file.
i. Step 610: add_emailhdr: otherwise, add a link in the index file formed from the time stamp and subject.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A method for creating and/or updating a dynamic website comprising:
a) receiving and storing one or more draft webpages in one or more email servers via one or more email clients, the one or more draft webpages having been created or edited by one or more users via the one or more email clients, and the one or more draft webpages in a form of one or more emails;
b) automatically converting the one or more draft webpages to one or more publishable webpages suitable for transfer to one or more web servers;
c) creating, updating, or both, one or more index webpages to reference at least one of the one or more publishable webpages; and d) publishing the one or more publishable webpages and one or more index webpages, as one or more published webpages of a website by transferring the one or more publishable webpages from the one or more email servers to the one or more web servers accessible by one or more web browsers;

wherein the one or more publishable webpages are indexed without having to index one or more previously published webpages;

wherein the one or more index webpages include a summary, and wherein the summary remains unimpacted when at least one or more indexed pages are added to the one or more index webpages; and wherein the one or more index webpages include an index listing which is a listing of the one or more published webpages located in a same indexed folder as the one or more index webpages.

2. The method of claim 1, wherein the one or more email clients are compatible with and support one or more of the following protocols: POP3, IMAP, SMTP, NNTP, LDAP, EWS, IPv6, MAPI, RSS Feeds, ATOM Feeds, iCalendar, MAPI/RPC, CalDAV, CardDAV, or any combination thereof.

3. The method of claim 1, wherein the automatically converting is completed by at least one of the one or more email servers.

4. The method of claim 1, wherein the one or more users create one or more folders on the one or more email clients and saves the one or more draft webpages within the one or more folders of the one or more email clients.

5. The method of claim 4, wherein the one or more folders are categorized by the one or more users as static, indexed, or both.

6. The method of claim 1, wherein the one or more draft webpages are in HTML format, text format, multi-content format, or any combination thereof.

7. The method of claim 6, wherein the one or more draft webpages each include a header and a body.

8. The method of claim 7, wherein the header includes a subject, a timestamp, a summary, or combination thereof and/or wherein the body includes one or more images, text, hyperlinks, or a combination thereof.

9. The method of claim 1, wherein at least one of the one or more publishable webpages residing within one or more of the indexed folders are automatically indexed before, after, or simultaneous with the creating, the updating, or both of one or more index webpages.

10. The method of claim 1, wherein the one or more published webpages which are indexed have a timestamp newer than a timestamp of a previously published index webpage.

11. The method of claim 1, wherein the one or more email servers include one or more processors and one or more non-transient storage mediums; and wherein the one or more processors execute automatic steps of the method based on software stored within the one or more non-transient storage mediums.

12. The method claim 1, wherein site-wide styling is automatically applied to at least one of the one or more publishable webpages by the one or more email servers.

13. A system for updating a dynamic website, the system comprising: one or more email servers having one or more processors, one or more non-transient storage mediums, or both, wherein the system updates the dynamic website by:

a) receiving and storing one or more draft webpages in the one or more email servers via one or more email clients, the one or more draft webpages having been created or edited by one or more users via the one or more email clients, and the one or more draft webpages in a form of one or more emails;

b) automatically converting the one or more draft webpages to one or more publishable webpages suitable for transfer to one or more web servers;

c) automatically creating, updating, or both, one or more index webpages to reference at least one of the one or more publishable webpages; and d) publishing the one or more publishable webpages and the one or more index webpages, as one or more published webpages of a website by transferring the one or more publishable webpages from the one or more email servers to the one or more web servers accessible by one or more web browsers;

wherein the one or more publishable webpages are indexed without having to index one or more previously published webpages;

wherein the one or more index webpages include a summary, and wherein the summary remains unimpacted when at least one or more indexed pages are added to the one or more index webpages; and wherein the one or more index webpages include an index listing which is a listing of the one or more published webpages located in a same indexed folder as the one or more index webpages.

14. The system of claim 13, wherein the one or more email servers are one or more IMAP servers.

15. The system of claim 13, wherein the one or more email servers include the one or more processors and the one or more non-transient storage mediums; and wherein the one or more processors execute software stored on the one or more non-transient storage mediums to automatically publish, index, or both the one or more draft webpages created in the one or more email clients by the one or more users.

16. The system of claim 13, wherein the one or more email servers are in communication with the one or more email clients and the one or more web servers.

17. The method of claim 2, wherein the one or more email clients are compatible with and support the IMAP protocol.

18. The method of claim 1, wherein the one or more draft webpages in the form of the one or more emails are in the form of one or more draft emails.

19. The system of claim 13, wherein the one or more email servers are configured to automatically apply site-wide styling to at least one of the one or more publishable webpages.

20. The system of claim 13, wherein the one or more draft webpages in the form of the one or more emails are in the form of one or more draft emails.

* * * * *